United States Patent
Rajaraman et al.

(10) Patent No.: US 8,412,768 B2
(45) Date of Patent: Apr. 2, 2013

(54) INTEGRATION GATEWAY

(75) Inventors: Arun Rajaraman, Marietta, GA (US); Prasoona Lanka, Chennai (IN); Suren Raj Magenthrarajah, Trichy (IN); Prabhushankar Muthuswamy, Chennai (IN); Arvind Patil, Pune (IN)

(73) Assignee: Ball Gaming, Inc., Las Vegas, NV (US)

( * ) Notice: Subject to any disclaimer, the term of this patent is extended or adjusted under 35 U.S.C. 154(b) by 929 days.

(21) Appl. No.: 12/500,298

(22) Filed: Jul. 9, 2009

(65) Prior Publication Data

US 2010/0093441 A1   Apr. 15, 2010

Related U.S. Application Data

(60) Provisional application No. 61/080,165, filed on Jul. 11, 2008.

(51) Int. Cl.
*G06F 15/16* (2006.01)
(52) U.S. Cl. .......................... 709/203; 709/220; 708/105
(58) Field of Classification Search .................. 709/203, 709/220; 718/105
See application file for complete search history.

(56) References Cited

U.S. PATENT DOCUMENTS

| | | | |
|---|---|---|---|
| 4,339,798 A | 7/1982 | Hedges et al. | 364/412 |
| 4,373,726 A | 2/1983 | Churchill et al. | 273/138 A |
| 4,592,377 A | 6/1986 | Paulsen et al. | 133/5 R |
| 4,725,079 A | 2/1988 | Koza et al. | 283/73 |
| 4,832,341 A | 5/1989 | Muller et al. | 273/139 |
| 4,948,138 A | 8/1990 | Pease et al. | 273/138 A |
| 5,083,800 A | 1/1992 | Lockton | 273/439 |
| 5,179,517 A | 1/1993 | Sarbin et al. | 364/410 |
| 5,199,710 A | 4/1993 | Lamle | 273/149 R |
| 5,258,837 A | 11/1993 | Gormley | 358/140 |
| 5,275,400 A | 1/1994 | Weingardt et al. | 273/85 CP |
| 5,321,241 A | 6/1994 | Craine | |
| 5,324,035 A | 6/1994 | Morris et al. | 273/138 A |
| 5,326,104 A | 7/1994 | Pease et al. | 273/138 A |
| 5,386,103 A | 1/1995 | DeBan et al. | 235/379 |
| 5,398,932 A | 3/1995 | Eberhardt et al. | 273/138 A |
| 5,472,194 A | 12/1995 | Breeding et al. | 273/138 A |
| 5,493,613 A | 2/1996 | Denno et al. | 380/24 |
| 5,505,449 A | 4/1996 | Eberhardt et al. | 273/138 A |
| 5,507,489 A | 4/1996 | Reibel et al. | 273/138 A |
| 5,562,284 A | 10/1996 | Stevens | 273/139 |
| 5,580,311 A | 12/1996 | Haste, III | 463/29 |

(Continued)

FOREIGN PATENT DOCUMENTS

DE   19940954 A1   3/2001
EP   1074955 A2   2/2001

(Continued)

OTHER PUBLICATIONS

Bally Technologies, Inc., iVIEW, http://ballytech.com/systems/product.cfm?id=9, download date Nov. 6, 2007, 2 pages.

(Continued)

*Primary Examiner* — Phuoc Nguyen
(74) *Attorney, Agent, or Firm* — Seed IP Law Group PLLC

(57) ABSTRACT

A message oriented middleware server application executable by at least one processor implements a message oriented middleware message provider that mediates messaging operations with a plurality of heterogeneous applications including a number of casino gaming applications, where instances of the heterogeneous applications which execute on the plurality of networked processor-based client devices including the networked processor-based casino gaming devices.

29 Claims, 3 Drawing Sheets

U.S. PATENT DOCUMENTS

| | | | |
|---|---|---|---|
| 5,605,334 A | 2/1997 | McCrea, Jr. | 273/309 |
| 5,605,506 A | 2/1997 | Hoorn et al. | 463/47 |
| 5,613,680 A | 3/1997 | Groves et al. | 273/138.2 |
| 5,613,912 A | 3/1997 | Slater | 463/25 |
| 5,643,086 A | 7/1997 | Alcorn et al. | 463/29 |
| 5,655,961 A | 8/1997 | Acres et al. | 463/27 |
| 5,707,287 A | 1/1998 | McCrea, Jr. | 463/27 |
| 5,737,418 A | 4/1998 | Saffari et al. | 380/9 |
| 5,741,183 A | 4/1998 | Acres et al. | 463/42 |
| 5,745,110 A | 4/1998 | Ertemalp | |
| 5,759,102 A | 6/1998 | Pease et al. | 463/42 |
| 5,770,533 A | 6/1998 | Franchi | 463/42 |
| 5,779,545 A | 7/1998 | Berg et al. | 463/22 |
| 5,800,268 A | 9/1998 | Molnick | 463/40 |
| 5,813,912 A | 9/1998 | Shultz | 463/25 |
| 5,823,879 A | 10/1998 | Goldberg et al. | 463/42 |
| 5,830,067 A | 11/1998 | Graves et al. | 463/40 |
| 5,830,068 A | 11/1998 | Brenner et al. | 463/42 |
| 5,850,447 A | 12/1998 | Peyret | 380/25 |
| 5,851,149 A | 12/1998 | Xidos et al. | 463/42 |
| 5,890,963 A | 4/1999 | Yen | 463/42 |
| 5,911,626 A | 6/1999 | McCrea, Jr. | 463/27 |
| 5,957,776 A | 9/1999 | Hoehne | 463/25 |
| 5,971,851 A | 10/1999 | Pascal et al. | 463/24 |
| 5,999,808 A | 12/1999 | LaDue | 455/412 |
| 6,001,016 A | 12/1999 | Walker et al. | 463/42 |
| 6,042,150 A | 3/2000 | Daley | 283/86 |
| 6,047,322 A | 4/2000 | Vaid et al. | |
| 6,068,553 A | 5/2000 | Parker | 463/27 |
| 6,077,161 A | 6/2000 | Wisler | 463/11 |
| 6,080,063 A | 6/2000 | Khosla | 463/42 |
| 6,089,980 A | 7/2000 | Gauselmann | 463/27 |
| 6,093,103 A | 7/2000 | McCrea, Jr. | 463/27 |
| 6,102,799 A | 8/2000 | Stupak | 463/27 |
| 6,104,815 A | 8/2000 | Alcorn et al. | 380/251 |
| 6,106,396 A | 8/2000 | Alcorn et al. | 463/29 |
| 6,110,041 A | 8/2000 | Walker et al. | 463/20 |
| 6,110,043 A | 8/2000 | Olsen | 463/27 |
| 6,117,012 A | 9/2000 | McCrea, Jr. | 463/27 |
| 6,135,887 A | 10/2000 | Pease et al. | 463/42 |
| 6,146,273 A | 11/2000 | Olsen | 463/27 |
| 6,149,522 A | 11/2000 | Alcorn et al. | 463/29 |
| 6,152,824 A | 11/2000 | Rothschild et al. | 463/42 |
| 6,165,069 A | 12/2000 | Sines et al. | 463/12 |
| 6,166,763 A | 12/2000 | Rhodes et al. | 348/143 |
| 6,168,523 B1 | 1/2001 | Piechowiak et al. | 463/26 |
| 6,183,366 B1 | 2/2001 | Goldberg et al. | 463/42 |
| 6,186,892 B1 | 2/2001 | Frank et al. | 463/19 |
| 6,210,277 B1 | 4/2001 | Stefan | 463/27 |
| 6,217,447 B1 | 4/2001 | Lofink et al. | 463/12 |
| 6,219,836 B1 | 4/2001 | Wells et al. | 717/11 |
| 6,234,898 B1 | 5/2001 | Belamant et al. | 463/25 |
| 6,244,958 B1 | 6/2001 | Acres | 463/26 |
| 6,251,014 B1 | 6/2001 | Stockdale et al. | 463/16 |
| 6,254,483 B1 | 7/2001 | Acres | |
| 6,254,484 B1 | 7/2001 | McCrea, Jr. | 463/27 |
| 6,264,561 B1 | 7/2001 | Saffari et al. | 463/42 |
| 6,275,586 B1 | 8/2001 | Kelly | 380/46 |
| 6,287,202 B1 | 9/2001 | Pascal et al. | 463/42 |
| 6,302,793 B1 | 10/2001 | Fertitta, III et al. | |
| 6,312,332 B1 | 11/2001 | Walker et al. | |
| 6,346,044 B1 | 2/2002 | McCrea, Jr. | 463/27 |
| 6,362,836 B1 | 3/2002 | Shaw et al. | |
| 6,383,076 B1 | 5/2002 | Tiedeken | 463/40 |
| 6,389,126 B1 | 5/2002 | Bjornberg et al. | |
| 6,394,900 B1 | 5/2002 | McGlone et al. | 463/20 |
| 6,400,272 B1 | 6/2002 | Holtzman et al. | 340/572.1 |
| 6,409,602 B1 | 6/2002 | Wiltshire et al. | 463/42 |
| 6,439,996 B2 | 8/2002 | LeMay et al. | 463/29 |
| 6,443,839 B2 | 9/2002 | Stockdale et al. | 463/16 |
| 6,459,882 B1 | 10/2002 | Palermo et al. | |
| 6,460,848 B1 | 10/2002 | Soltys et al. | 273/149 R |
| 6,464,584 B2 | 10/2002 | Oliver | 463/25 |
| 6,488,581 B1 | 12/2002 | Stockdale | 463/29 |
| 6,488,585 B1 | 12/2002 | Wells et al. | 463/43 |
| 6,503,147 B1 | 1/2003 | Stockdale et al. | 463/29 |
| 6,505,772 B1 | 1/2003 | Mollett et al. | 235/379 |
| 6,508,709 B1 | 1/2003 | Karmarkar | 463/42 |
| 6,508,710 B1 | 1/2003 | Paravia et al. | 463/42 |
| 6,517,435 B2 | 2/2003 | Soltys et al. | 463/25 |
| 6,517,436 B2 | 2/2003 | Soltys et al. | 463/29 |
| 6,520,857 B2 | 2/2003 | Soltys et al. | 463/29 |
| 6,527,271 B2 | 3/2003 | Soltys et al. | 273/148 R |
| 6,527,638 B1 | 3/2003 | Walker et al. | 463/25 |
| 6,530,836 B2 | 3/2003 | Soltys et al. | 463/29 |
| 6,530,837 B2 | 3/2003 | Soltys et al. | 463/29 |
| 6,533,276 B2 | 3/2003 | Soltys et al. | 273/148 R |
| 6,533,662 B2 | 3/2003 | Soltys et al. | 463/25 |
| 6,575,833 B1 | 6/2003 | Stockdale | 463/29 |
| 6,578,847 B1 | 6/2003 | Hedrick et al. | 273/138.2 |
| 6,579,180 B2 | 6/2003 | Soltys et al. | 463/25 |
| 6,579,181 B2 | 6/2003 | Soltys et al. | 463/25 |
| 6,581,747 B1 | 6/2003 | Charlier et al. | 194/214 |
| 6,595,857 B2 | 7/2003 | Soltys et al. | 463/29 |
| 6,607,441 B1 | 8/2003 | Acres | 463/25 |
| 6,609,978 B1 | 8/2003 | Paulsen | 463/42 |
| 6,612,928 B1 | 9/2003 | Bradford et al. | 463/29 |
| 6,629,184 B1 | 9/2003 | Berg et al. | 710/306 |
| 6,638,170 B1 | 10/2003 | Crumby | 463/42 |
| 6,641,484 B2 | 11/2003 | Oles et al. | 463/47 |
| 6,645,077 B2 | 11/2003 | Rowe | 463/42 |
| 6,652,378 B2 | 11/2003 | Cannon et al. | 463/20 |
| 6,656,048 B2 | 12/2003 | Olsen | |
| 6,663,490 B2 | 12/2003 | Soltys et al. | 463/25 |
| 6,675,152 B1 | 1/2004 | Prasad et al. | 705/64 |
| 6,676,522 B2 | 1/2004 | Rowe et al. | 463/42 |
| 6,682,421 B1 | 1/2004 | Rowe et al. | 463/25 |
| 6,682,423 B2 | 1/2004 | Brosnan et al. | 463/29 |
| 6,685,564 B2 | 2/2004 | Oliver | 463/25 |
| 6,685,567 B2 | 2/2004 | Cockerille et al. | 463/43 |
| 6,688,979 B2 | 2/2004 | Soltys et al. | 463/25 |
| 6,699,128 B1 | 3/2004 | Beadell et al. | 463/46 |
| 6,702,291 B2 | 3/2004 | Grebler et al. | 273/292 |
| 6,712,695 B2 | 3/2004 | Mothwurf et al. | |
| 6,712,696 B2 | 3/2004 | Soltys et al. | 463/25 |
| 6,718,361 B1 | 4/2004 | Basani et al. | |
| 6,728,740 B2 | 4/2004 | Kelly et al. | 708/250 |
| 6,743,102 B1 | 6/2004 | Fiechter et al. | 463/42 |
| 6,745,330 B1 | 6/2004 | Maillot | |
| 6,746,330 B2 | 6/2004 | Cannon | 463/25 |
| 6,752,312 B1 | 6/2004 | Chamberlain et al. | 235/375 |
| 6,755,741 B1 | 6/2004 | Rafaeli | 463/25 |
| 6,758,751 B2 | 7/2004 | Soltys et al. | 463/29 |
| 6,800,029 B2 | 10/2004 | Rowe et al. | 463/25 |
| 6,811,488 B2 | 11/2004 | Paravia et al. | 463/42 |
| 6,817,948 B2 | 11/2004 | Pascal et al. | 463/42 |
| 6,823,419 B2 | 11/2004 | Berg et al. | 710/306 |
| 6,837,789 B2 | 1/2005 | Garahi et al. | 463/29 |
| 6,846,238 B2 | 1/2005 | Wells | 463/39 |
| 6,848,994 B1 | 2/2005 | Knust et al. | 463/25 |
| 6,866,581 B2 | 3/2005 | Martinek et al. | 463/16 |
| 6,866,586 B2 | 3/2005 | Oberberger et al. | 463/42 |
| 6,884,173 B2 | 4/2005 | Gauselmann | |
| 6,884,174 B2 | 4/2005 | Lundy et al. | 463/42 |
| 6,896,618 B2 | 5/2005 | Benoy et al. | 463/25 |
| 6,899,627 B2 | 5/2005 | Lam et al. | 463/40 |
| 6,905,411 B2 | 6/2005 | Nguyen et al. | 463/25 |
| 6,908,387 B2 | 6/2005 | Hedrick et al. | |
| 6,962,530 B2 | 11/2005 | Jackson | 463/29 |
| 6,971,956 B2 | 12/2005 | Rowe et al. | 463/25 |
| 6,972,682 B2 | 12/2005 | Lareau et al. | 340/568.1 |
| 6,993,587 B1 | 1/2006 | Basani et al. | |
| 6,997,803 B2 | 2/2006 | LeMay et al. | 463/20 |
| 7,025,674 B2 | 4/2006 | Adams et al. | |
| 7,035,626 B2 | 4/2006 | Luciano, Jr. | 455/414.1 |
| 7,050,056 B2 | 5/2006 | Meyringer | |
| 7,062,470 B2 | 6/2006 | Prasad et al. | 705/64 |
| 7,086,947 B2 | 8/2006 | Walker et al. | 463/25 |
| 7,099,035 B2 | 8/2006 | Brooks et al. | 358/1.15 |
| 7,112,138 B2 | 9/2006 | Hedrick et al. | 463/29 |
| 7,114,718 B2 | 10/2006 | Grauzer et al. | 273/149 R |
| 7,116,782 B2 | 10/2006 | Jackson et al. | 380/251 |
| 7,147,558 B2 | 12/2006 | Giobbi | 463/25 |
| 7,168,089 B2 | 1/2007 | Nguyen et al. | 726/4 |
| 7,179,170 B2 | 2/2007 | Martinek et al. | 463/29 |
| 7,186,181 B2 | 3/2007 | Rowe | 463/42 |
| 7,197,765 B2 | 3/2007 | Chan et al. | 726/8 |

| Patent | Date | Inventor | Class |
|---|---|---|---|
| 7,198,571 B2 | 4/2007 | LeMay et al. | 463/25 |
| RE39,644 E | 5/2007 | Alcorn et al. | 380/251 |
| 7,291,068 B2 | 11/2007 | Bryant et al. | 463/25 |
| 7,303,475 B2 | 12/2007 | Britt et al. | 463/42 |
| 7,309,065 B2 | 12/2007 | Yoseloff et al. | 273/292 |
| 7,311,605 B2 | 12/2007 | Moser | 463/25 |
| 7,329,185 B2 | 2/2008 | Conover et al. | |
| 7,330,822 B1 | 2/2008 | Robson et al. | |
| 7,331,520 B2 | 2/2008 | Silva et al. | 235/381 |
| 7,337,330 B2 | 2/2008 | Gatto et al. | |
| 7,346,682 B2 | 3/2008 | Basani et al. | |
| 7,349,920 B1 | 3/2008 | Feinberg et al. | |
| 7,351,147 B2 | 4/2008 | Stockdale et al. | 463/29 |
| 7,356,770 B1 | 4/2008 | Jackson | |
| 7,363,342 B1 | 4/2008 | Wang et al. | |
| 7,364,510 B2 | 4/2008 | Walker et al. | |
| 7,370,282 B2 | 5/2008 | Cary | |
| 7,384,339 B2 | 6/2008 | LeMay et al. | 463/30 |
| 7,398,327 B2 | 7/2008 | Lee | 709/250 |
| 7,410,422 B2 | 8/2008 | Fine | 463/42 |
| 7,419,428 B2 | 9/2008 | Rowe | 463/25 |
| 7,427,233 B2 | 9/2008 | Walker et al. | 463/16 |
| 7,427,236 B2 | 9/2008 | Kaminkow et al. | |
| 7,434,805 B2 | 10/2008 | Grauzer et al. | 273/149 R |
| 7,435,179 B1 | 10/2008 | Ford | 463/42 |
| 7,438,221 B2 | 10/2008 | Washington et al. | |
| 7,438,643 B2 | 10/2008 | Brosnan et al. | 463/42 |
| 7,455,591 B2 | 11/2008 | Nguyen | 463/42 |
| 7,460,863 B2 | 12/2008 | Steelberg et al. | 455/419 |
| 7,465,231 B2 | 12/2008 | Lewin et al. | |
| 7,473,178 B2 | 1/2009 | Boyd et al. | |
| 7,483,394 B2 | 1/2009 | Chang et al. | |
| 7,500,915 B2 | 3/2009 | Wolf et al. | 463/27 |
| 7,510,474 B2 | 3/2009 | Carter, Sr. | 463/25 |
| 7,515,718 B2 | 4/2009 | Nguyen et al. | 380/278 |
| 7,534,169 B2 | 5/2009 | Amaitis et al. | 463/39 |
| 7,549,576 B2 | 6/2009 | Alderucci et al. | 235/380 |
| 7,559,080 B2 | 7/2009 | Bhargavan et al. | 726/1 |
| 7,566,274 B2 | 7/2009 | Johnson et al. | |
| 7,575,234 B2 | 8/2009 | Soltys et al. | 273/149 R |
| 7,577,847 B2 | 8/2009 | Nguyen et al. | 713/186 |
| 7,578,739 B2 | 8/2009 | Gauselmann | 463/27 |
| 7,585,217 B2 | 9/2009 | Lutnick et al. | 463/16 |
| 7,594,030 B2 | 9/2009 | Teodosiu et al. | |
| 7,611,407 B1 | 11/2009 | Itkis et al. | 463/29 |
| 7,611,409 B2 | 11/2009 | Muir et al. | 463/29 |
| 7,617,151 B2 | 11/2009 | Rowe | 705/39 |
| 7,618,317 B2 | 11/2009 | Jackson | |
| 7,629,886 B2 | 12/2009 | Steeves | 340/572.1 |
| 7,634,550 B2 | 12/2009 | Wolber et al. | 709/220 |
| 7,637,810 B2 | 12/2009 | Amaitis et al. | 463/25 |
| 7,644,861 B2 | 1/2010 | Alderucci et al. | 235/382 |
| 7,648,414 B2 | 1/2010 | McNutt et al. | 463/25 |
| 7,674,179 B2 | 3/2010 | Baerlocher et al. | |
| 7,682,249 B2 | 3/2010 | Winans et al. | 463/31 |
| 7,684,874 B2 | 3/2010 | Schlottmann et al. | 700/9 |
| 7,685,516 B2 | 3/2010 | Fischer | |
| 7,685,593 B2 | 3/2010 | Solomon et al. | 717/170 |
| 7,686,688 B2 | 3/2010 | Friedman et al. | 463/25 |
| 7,690,995 B2 | 4/2010 | Frankulin et al. | 463/41 |
| 7,699,697 B2 | 4/2010 | Darrah et al. | 463/16 |
| 7,699,703 B2 | 4/2010 | Muir et al. | 463/29 |
| 7,702,719 B1 | 4/2010 | Betz et al. | |
| 7,706,895 B2 * | 4/2010 | Callaghan | 700/17 |
| 7,722,453 B2 | 5/2010 | Lark et al. | 463/16 |
| 7,730,198 B2 | 6/2010 | Ruppert et al. | |
| 7,744,462 B2 | 6/2010 | Grav et al. | 463/27 |
| 7,747,741 B2 | 6/2010 | Basani et al. | |
| 7,753,790 B2 | 7/2010 | Nguyen et al. | 463/42 |
| 7,769,877 B2 | 8/2010 | McBride et al. | 709/230 |
| 7,778,635 B2 | 8/2010 | Crookham et al. | |
| 7,780,525 B2 | 8/2010 | Walker et al. | 463/29 |
| 7,780,526 B2 | 8/2010 | Nguyen et al. | 463/29 |
| 7,780,529 B2 | 8/2010 | Rowe et al. | |
| 7,783,881 B2 | 8/2010 | Morrow et al. | 713/165 |
| 7,785,204 B2 | 8/2010 | Wells et al. | |
| 7,824,267 B2 | 11/2010 | Cannon et al. | 463/42 |
| 7,828,649 B2 | 11/2010 | Cuddy et al. | 463/26 |
| 7,841,946 B2 | 11/2010 | Walker et al. | |
| 7,846,020 B2 | 12/2010 | Walker et al. | |
| 7,850,528 B2 | 12/2010 | Wells | |
| 7,857,702 B2 | 12/2010 | Hilbert | |
| 7,862,425 B2 | 1/2011 | Cavagna | |
| 7,874,920 B2 | 1/2011 | Hornik et al. | |
| 7,874,921 B2 | 1/2011 | Baszucki et al. | |
| 7,898,679 B2 | 3/2011 | Brack et al. | |
| 7,901,294 B2 | 3/2011 | Walker et al. | |
| 7,937,464 B2 | 5/2011 | Ruppert et al. | |
| 8,028,046 B2 | 9/2011 | Elliott et al. | |
| 8,057,297 B2 | 11/2011 | Silvestro | |
| 8,073,657 B2 | 12/2011 | Moore, III et al. | |
| 8,117,461 B2 | 2/2012 | Bigelow, Jr. et al. | |
| 2001/0019966 A1 | 9/2001 | Idaka | 463/40 |
| 2002/0004824 A1 | 1/2002 | Cuan et al. | |
| 2002/0111213 A1 | 8/2002 | McEntee et al. | 463/42 |
| 2002/0113371 A1 | 8/2002 | Snow | 273/292 |
| 2002/0115487 A1 | 8/2002 | Wells | 463/42 |
| 2002/0142844 A1 | 10/2002 | Kerr | |
| 2003/0004871 A1 | 1/2003 | Rowe | 705/39 |
| 2003/0032474 A1 | 2/2003 | Kaminkow | 463/25 |
| 2003/0042679 A1 | 3/2003 | Snow | 273/292 |
| 2003/0064798 A1 | 4/2003 | Grauzer et al. | 463/29 |
| 2003/0075869 A1 | 4/2003 | Breeding et al. | 273/292 |
| 2003/0078103 A1 | 4/2003 | LeMay et al. | 463/43 |
| 2003/0090064 A1 | 5/2003 | Hoyt et al. | 273/292 |
| 2003/0104865 A1 | 6/2003 | Itkis et al. | 463/39 |
| 2003/0130024 A1 | 7/2003 | Darby | 463/13 |
| 2003/0203755 A1 | 10/2003 | Jackson | 463/42 |
| 2003/0206548 A1 | 11/2003 | Bannai et al. | |
| 2003/0224858 A1 | 12/2003 | Yoseloff et al. | 463/43 |
| 2003/0228912 A1 | 12/2003 | Wells et al. | 463/43 |
| 2003/0232651 A1 | 12/2003 | Huard et al. | 463/42 |
| 2004/0002386 A1 | 1/2004 | Wolfe et al. | |
| 2004/0002388 A1 | 1/2004 | Larsen et al. | |
| 2004/0029635 A1 | 2/2004 | Giobbi | 463/30 |
| 2004/0043815 A1 | 3/2004 | Kaminkow | 463/25 |
| 2004/0043820 A1 | 3/2004 | Schlottmann | 463/43 |
| 2004/0048671 A1 | 3/2004 | Rowe | 463/42 |
| 2004/0068654 A1 | 4/2004 | Cockerille et al. | 713/168 |
| 2004/0082385 A1 | 4/2004 | Silva et al. | 463/40 |
| 2004/0092310 A1 | 5/2004 | Brosnan et al. | 463/42 |
| 2004/0106452 A1 | 6/2004 | Nguyen et al. | 463/42 |
| 2004/0110119 A1 | 6/2004 | Riconda et al. | 434/350 |
| 2004/0127291 A1 | 7/2004 | George et al. | 463/42 |
| 2004/0133485 A1 | 7/2004 | Schoonmaker et al. | 705/30 |
| 2004/0142744 A1 | 7/2004 | Atkinson et al. | 463/29 |
| 2004/0166940 A1 | 8/2004 | Rothschild | |
| 2004/0185936 A1 | 9/2004 | Block et al. | 463/42 |
| 2004/0254993 A1 * | 12/2004 | Mamas | 709/206 |
| 2005/0043094 A1 | 2/2005 | Nguyen et al. | 463/42 |
| 2005/0054438 A1 | 3/2005 | Rothschild et al. | 463/29 |
| 2005/0054445 A1 | 3/2005 | Gatto et al. | |
| 2005/0070358 A1 | 3/2005 | Angell et al. | 463/39 |
| 2005/0080898 A1 | 4/2005 | Block | |
| 2005/0119052 A1 | 6/2005 | Russell et al. | 463/42 |
| 2005/0124411 A1 | 6/2005 | Schneider et al. | 463/29 |
| 2005/0153778 A1 | 7/2005 | Nelson et al. | 463/42 |
| 2005/0192099 A1 | 9/2005 | Nguyen et al. | |
| 2005/0222891 A1 | 10/2005 | Chan et al. | |
| 2005/0239542 A1 | 10/2005 | Olsen | 463/27 |
| 2005/0282626 A1 | 12/2005 | Manfredi et al. | 463/25 |
| 2006/0004618 A1 | 1/2006 | Brixius | 705/8 |
| 2006/0009282 A1 | 1/2006 | George et al. | 463/29 |
| 2006/0015716 A1 | 1/2006 | Thornton et al. | |
| 2006/0026499 A1 | 2/2006 | Weddle | |
| 2006/0035707 A1 | 2/2006 | Nguyen et al. | 463/29 |
| 2006/0035713 A1 | 2/2006 | Cockerille et al. | |
| 2006/0046849 A1 | 3/2006 | Kovacs | 463/39 |
| 2006/0116208 A1 | 6/2006 | Chen et al. | 463/43 |
| 2006/0121970 A1 | 6/2006 | Khal | 463/16 |
| 2006/0183541 A1 | 8/2006 | Okada et al. | 463/29 |
| 2006/0195847 A1 | 8/2006 | Amano et al. | |
| 2006/0196686 A1 | 9/2006 | Gatto et al. | |
| 2006/0205508 A1 | 9/2006 | Green | 463/40 |
| 2006/0247013 A1 | 11/2006 | Walker et al. | 463/20 |
| 2006/0247057 A1 | 11/2006 | Green et al. | 463/42 |
| 2006/0248161 A1 | 11/2006 | O'Brien et al. | |
| 2006/0253702 A1 | 11/2006 | Lowell et al. | |

| | | | |
|---|---|---|---|
| 2006/0259604 A1* | 11/2006 | Kotchavi et al. ............... 709/223 |
| 2006/0277487 A1 | 12/2006 | Poulsen et al. ................. 715/772 |
| 2007/0004501 A1 | 1/2007 | Brewer et al. |
| 2007/0015583 A1 | 1/2007 | Tran ................. 463/40 |
| 2007/0026935 A1 | 2/2007 | Wolf et al. |
| 2007/0032288 A1 | 2/2007 | Nelson et al. |
| 2007/0033247 A1 | 2/2007 | Martin |
| 2007/0054740 A1 | 3/2007 | Salls et al. ........ 463/42 |
| 2007/0057453 A1 | 3/2007 | Soltys et al. ........ 273/149 P |
| 2007/0057454 A1 | 3/2007 | Fleckenstein ........ 273/149 R |
| 2007/0057469 A1 | 3/2007 | Grauzer et al. ........ 273/309 |
| 2007/0060259 A1 | 3/2007 | Pececnik ........ 463/16 |
| 2007/0060307 A1 | 3/2007 | Mathis et al. ........ 463/25 |
| 2007/0060365 A1 | 3/2007 | Tien et al. ........ 463/42 |
| 2007/0077995 A1 | 4/2007 | Oak et al. |
| 2007/0082737 A1 | 4/2007 | Morrow et al. ........ 463/42 |
| 2007/0093298 A1 | 4/2007 | Brunet ........ 463/42 |
| 2007/0105628 A1 | 5/2007 | Arbogast et al. |
| 2007/0111775 A1 | 5/2007 | Yoseloff ........ 463/16 |
| 2007/0111791 A1 | 5/2007 | Arbogast et al. ........ 463/40 |
| 2007/0111794 A1 | 5/2007 | Hogan et al. ........ 463/42 |
| 2007/0117608 A1 | 5/2007 | Roper et al. ........ 463/16 |
| 2007/0124483 A1 | 5/2007 | Marples et al. |
| 2007/0129145 A1 | 6/2007 | Blackburn et al. ........ 463/42 |
| 2007/0150329 A1 | 6/2007 | Brook et al. |
| 2007/0155490 A1 | 7/2007 | Phillips et al. |
| 2007/0167235 A1 | 7/2007 | Naicker ........ 463/42 |
| 2007/0191102 A1 | 8/2007 | Coliz et al. ........ 463/42 |
| 2007/0192748 A1 | 8/2007 | Martin et al. ........ 715/856 |
| 2007/0198418 A1 | 8/2007 | Macdonald et al. ........ 705/52 |
| 2007/0198656 A1* | 8/2007 | Mazzaferri et al. ........ 709/218 |
| 2007/0208816 A1 | 9/2007 | Baldwin et al. ........ 709/206 |
| 2007/0214030 A1 | 9/2007 | Shear et al. |
| 2007/0218998 A1 | 9/2007 | Arbogast et al. ........ 463/42 |
| 2007/0235521 A1 | 10/2007 | Mateen et al. ........ 235/379 |
| 2007/0241497 A1 | 10/2007 | Soltys et al. ........ 273/149 R |
| 2007/0241498 A1 | 10/2007 | Soltys ........ 273/149 R |
| 2007/0243925 A1 | 10/2007 | LeMay et al. ........ 463/20 |
| 2007/0243927 A1 | 10/2007 | Soltys ........ 463/25 |
| 2007/0243935 A1 | 10/2007 | Huizinga ........ 463/42 |
| 2007/0259709 A1 | 11/2007 | Kelly et al. ........ 463/20 |
| 2007/0259711 A1 | 11/2007 | Thomas ........ 463/22 |
| 2007/0287535 A1 | 12/2007 | Soltys ........ 463/29 |
| 2007/0298868 A1 | 12/2007 | Soltys ........ 463/25 |
| 2008/0004108 A1 | 1/2008 | Klinkhammer ........ 463/29 |
| 2008/0009344 A1 | 1/2008 | Graham et al. |
| 2008/0026832 A1 | 1/2008 | Stevens et al. |
| 2008/0026848 A1 | 1/2008 | Byng |
| 2008/0038035 A1 | 2/2008 | Shuldman et al. ........ 400/76 |
| 2008/0045341 A1 | 2/2008 | Englman |
| 2008/0064501 A1 | 3/2008 | Patel ........ 463/40 |
| 2008/0065590 A1 | 3/2008 | Castro et al. |
| 2008/0076572 A1 | 3/2008 | Nguyen et al. ........ 463/42 |
| 2008/0085772 A1 | 4/2008 | Iddings et al. |
| 2008/0090651 A1 | 4/2008 | Baerlocher ........ 463/27 |
| 2008/0096659 A1 | 4/2008 | Kreloff et al. ........ 463/39 |
| 2008/0108433 A1 | 5/2008 | DiMichele et al. |
| 2008/0113764 A1 | 5/2008 | Soltys ........ 463/22 |
| 2008/0113773 A1 | 5/2008 | Johnson et al. ........ 463/25 |
| 2008/0119284 A1 | 5/2008 | Luciano, Jr. et al. ........ 463/42 |
| 2008/0146337 A1 | 6/2008 | Halonen et al. ........ 463/42 |
| 2008/0153599 A1 | 6/2008 | Atashband et al. ........ 463/42 |
| 2008/0153600 A1 | 6/2008 | Swarna ........ 463/43 |
| 2008/0154916 A1 | 6/2008 | Atashband ........ 707/10 |
| 2008/0155665 A1 | 6/2008 | Ruppert et al. ........ 726/5 |
| 2008/0162729 A1 | 7/2008 | Ruppert ........ 709/249 |
| 2008/0171588 A1 | 7/2008 | Atashband ........ 463/20 |
| 2008/0171598 A1 | 7/2008 | Deng ........ 463/40 |
| 2008/0200255 A1 | 8/2008 | Eisele ........ 463/42 |
| 2008/0243697 A1 | 10/2008 | Irving et al. ........ 705/54 |
| 2008/0244565 A1 | 10/2008 | Levidow et al. |
| 2008/0261701 A1 | 10/2008 | Lewin et al. |
| 2008/0287197 A1 | 11/2008 | Ruppert et al. |
| 2008/0293494 A1 | 11/2008 | Adiraju et al. |
| 2008/0305854 A1* | 12/2008 | Graham et al. ........ 463/25 |
| 2008/0311971 A1 | 12/2008 | Dean ........ 463/20 |
| 2008/0318671 A1* | 12/2008 | Rowe et al. ........ 463/26 |
| 2008/0318685 A9 | 12/2008 | Oak et al. |
| 2009/0005176 A1 | 1/2009 | Morrow et al. ........ 463/43 |
| 2009/0005177 A1 | 1/2009 | Kishi et al. |
| 2009/0011833 A1 | 1/2009 | Seelig et al. |
| 2009/0029775 A1 | 1/2009 | Ruppert et al. |
| 2009/0115133 A1 | 5/2009 | Kelly et al. ........ 273/274 |
| 2009/0117994 A1 | 5/2009 | Kelly et al. ........ 463/25 |
| 2009/0118001 A1 | 5/2009 | Kelly et al. ........ 463/29 |
| 2009/0118005 A1 | 5/2009 | Kelly et al. ........ 463/31 |
| 2009/0118006 A1 | 5/2009 | Kelly et al. ........ 463/31 |
| 2009/0124329 A1 | 5/2009 | Palmisano |
| 2009/0124392 A1 | 5/2009 | Ruppert et al. ........ 463/42 |
| 2009/0124394 A1 | 5/2009 | Swarna ........ 463/43 |
| 2009/0125603 A1 | 5/2009 | Atashband et al. ........ 709/207 |
| 2009/0131144 A1 | 5/2009 | Allen ........ 463/20 |
| 2009/0131163 A1 | 5/2009 | Arbogast et al. ........ 463/29 |
| 2009/0132720 A1 | 5/2009 | Ruppert et al. ........ 709/231 |
| 2009/0170594 A1 | 7/2009 | Delaney et al. ........ 463/25 |
| 2009/0176556 A1 | 7/2009 | Gagner et al. |
| 2009/0176580 A1 | 7/2009 | Herrmann et al. |
| 2009/0181776 A1 | 7/2009 | Deng ........ 463/42 |
| 2009/0253483 A1 | 10/2009 | Pacey et al. |
| 2009/0270170 A1 | 10/2009 | Patton ........ 463/36 |
| 2009/0275394 A1 | 11/2009 | Young et al. ........ 463/25 |
| 2009/0275400 A1 | 11/2009 | Rehm et al. ........ 463/27 |
| 2009/0275401 A1 | 11/2009 | Allen et al. ........ 463/29 |
| 2009/0275402 A1 | 11/2009 | Backover et al. ........ 463/29 |
| 2009/0276341 A1 | 11/2009 | Mcmahan et al. ........ 705/30 |
| 2009/0298583 A1 | 12/2009 | Jones ........ 463/29 |
| 2009/0307069 A1 | 12/2009 | Meyerhofer ........ 705/14.12 |
| 2009/0325708 A9 | 12/2009 | Kerr |
| 2010/0016067 A1 | 1/2010 | White et al. ........ 463/25 |
| 2010/0016068 A1 | 1/2010 | White et al. ........ 463/25 |
| 2010/0029385 A1 | 2/2010 | Garvey et al. |
| 2010/0048291 A1 | 2/2010 | Warkentin |
| 2010/0093441 A1 | 4/2010 | Rajaraman et al. ........ 463/42 |
| 2010/0124990 A1 | 5/2010 | Crowder ........ 463/42 |
| 2010/0125851 A1 | 5/2010 | Singh et al. ........ 718/104 |
| 2010/0130280 A1 | 5/2010 | Arezina et al. |
| 2010/0131772 A1 | 5/2010 | Atashband et al. ........ 713/189 |
| 2010/0151926 A1 | 6/2010 | Ruppert et al. |
| 2010/0161798 A1 | 6/2010 | Ruppert et al. |
| 2010/0234104 A1 | 9/2010 | Ruppert et al. ........ 463/30 |
| 2010/0248842 A1 | 9/2010 | Ruppert |
| 2011/0009184 A1 | 1/2011 | Byng |
| 2011/0124417 A1 | 5/2011 | Baynes et al. |
| 2012/0110649 A1 | 5/2012 | Murphy |

FOREIGN PATENT DOCUMENTS

| | | |
|---|---|---|
| EP | 1463008 A2 | 9/2004 |
| GB | 2380143 A | 4/2003 |
| JP | 8255059 | 10/1996 |
| KR | 2001-0084838 | 9/2001 |
| KR | 2002-0061793 | 7/2002 |
| KR | 2003-0091635 | 12/2003 |
| WO | 02/05914 A1 | 1/2002 |
| WO | 03/60846 A2 | 7/2003 |
| WO | 2005/035084 | 4/2005 |
| WO | 2007/033207 A2 | 3/2007 |

OTHER PUBLICATIONS

Bally TMS, "MP21—Automated Table Tracking/Features," 2 pages, Nov. 2005.

Bally TMS, "MPBacc—Specifications/Specifications," 2 pages, Nov. 2005.

Bally TMS, "MPLite—Table Management System/Features," 2 pages, Nov. 2005.

Bulavsky, J., "Tracking the Tables," *Casino Journal*, May 2004, pp. 44-47, accessed Dec. 21, 2005, URL = http://www.ascendgaming.com/cj/vendors_manufacturers_table/Trackin916200411141AM.htm, 5 pages.

Burke, A., "Tracking the Tables," reprinted from *International Gaming & Wagering Business*, Aug. 2003, 4 pages.

Gros, R., "All You Ever Wanted to Know About Table Games," reprinted from *Global Gaming Business*, Aug. 1, 2003, 2 pages.

MagTek, "Port Powered Swipe Reader," Technical Reference Manual, Manual Part No. 99875094 Rev 12, Jun. 2003, 20 pages.

Mikohn, "Mikohn Tablelink—The Industry's Premier Table Tracking Solution Delivers Improvements Straight to the Bottom Line," 2 pages, before Jan. 1, 2004.

Terdiman, D., "Who's Holding the Aces Now?", reprinted from *Wired News*, Aug. 18, 2003, 2 pages.

Winkler, C., "Product Spotlight: MindPlay," reprinted from *Gaming and Leisure Technology*, Fall 2003, 2 pages.

International Search Report, mailed Feb. 16, 2010, for PCT/US2009/050133, 3 pages.

Written Opinion, mailed Feb. 16, 2010, for PCT/US2009/050133, 4 pages.

* cited by examiner

INTEGRATION GATEWAY

CROSS-REFERENCE TO RELATED APPLICATION

This application claims the benefit under 35 U.S.C. §119 (e) of U.S. Provisional Patent Application No. 61/080,165 filed Jul. 11, 2008, where this provisional application is incorporated herein by reference in its entirety.

BACKGROUND OF THE INVENTION

1. Field of the Invention

This description generally relates to the field of communications networks, and more particularly to middleware for facilitating communication in heterogeneous communications networks.

2. Description of the Related Art

Many gaming properties are attempting to integrate and leverage the information and capabilities provided by all of the computing devices located on their property. This would provide players with a more seamless experience, as they would have access to greater functionality at every computing device they interact with. Moreover, the gaming properties will also be able to better track players' activities and better determine what service appeal to which players.

Unfortunately, gaming properties typically include a variety of different gaming devices, gaming servers and gaming software. Often, these gaming devices, gaming servers and gaming software have been distributed by different gaming suppliers, and may be associated with proprietary protocols developed by each of those different gaming suppliers. Indeed, many gaming properties have legacy gaming devices and software on their gaming floors that use protocols that are no longer supported. Thus, the task of interoperability and communication has been made much more difficult by these heterogeneous components. Although there are communication standards that have been developed by groups such as the Gaming Standards Association, many gaming suppliers expand upon (or even ignore) these standards in order to improve the functionality they can offer.

It would therefore be desirable to enable improved communication between heterogeneous components in a gaming property.

Figure 1:
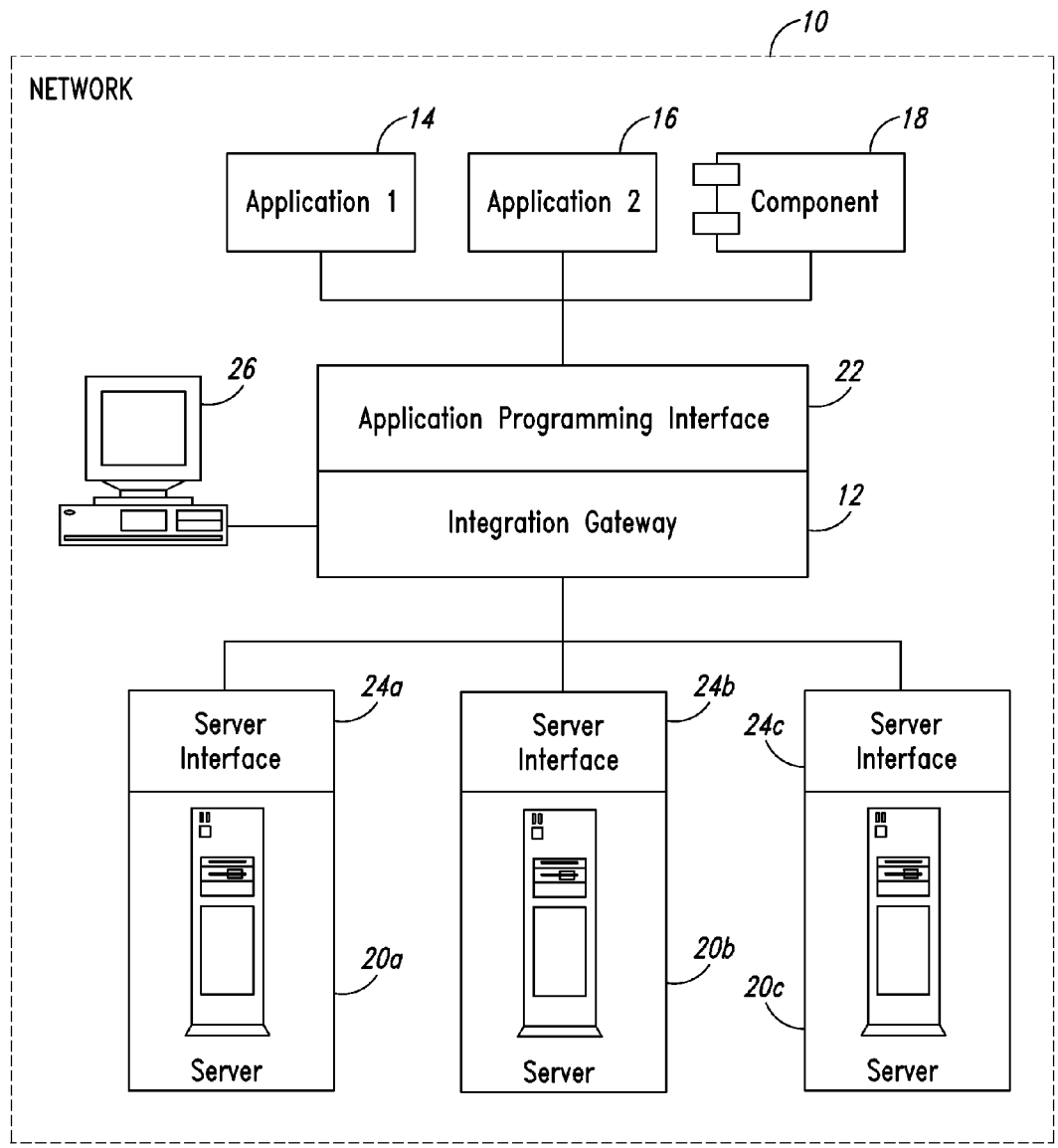
FIG. 1 is a schematic view of a network including an integration gateway for enabling communications among heterogeneous components, according to one illustrated embodiment.

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with servers, networks, displays, and/or with computer type devices have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Any process descriptions or blocks in flowcharts described below may be understood as representing modules, segments, or portions of code which include one or more executable instructions for implementing specific logical functions. In alternative embodiments, various logical functions, or acts may be executed out of order from that shown or discussed, including substantially concurrently or in reverse order, and/or manually, depending on the functionality involved, as would be understood by those reasonably skilled in the art.

GLOSSARY

Acknowledgement: Control messages exchanged between clients and broker to ensure reliable delivery. There are two general types of acknowledgement: client acknowledgements and broker acknowledgements.

Administered Objects: A pre-configured object—a connection factory or a destination—that encapsulates provider-specific implementation details, and is created by an administrator for use by one or more JMS clients. The use of administered objects allows JMS clients to be provider-independent. Administered objects are placed in a JNDI name space by and are accessed by JMS clients using JNDI lookups.

Asynchronous Messaging: An exchange of messages in which the sending of a message does not depend upon the readiness of the consumer to receive it. In other words, the sender of a message need not wait for the sending method to return before it continues with other work. If a message consumer is busy or offline, the message is sent and subsequently received when the consumer is ready.

Authentication: The process by which only verified users are allowed to set up a connection to a broker.

Authorization: The process by which a message service determines whether a user can access message service resources, such as connection services or destinations, to perform specific operations supported by the message service.

Broker: The Message Queue entity that may manage, inter alia, message routing, delivery, persistence, security, and logging, and that provides an interface for monitoring and tuning performance and resource use.

Client: An application (or software component) that interacts with other clients using a message service to exchange messages. The client can be a producing client, a consuming client, or both.

Connection: A communication channel between a client and a broker used to pass both payload messages and controls.

Messages Connection Factory: The administered object the client uses to create a connection to a broker. This can be a Connection Factory object, a Queue Connection Factory object or a Topic Connection Factory object.

Consumer: An object (Message Consumer) created by a session that is used for receiving messages sent from a destination. In the point-to-point delivery model, the consumer is a receiver or browser (Queue Receiver or Queue Browser); in the publish/subscribe delivery model, the consumer is a subscriber (Topic Subscriber).

Data store: A database where information (e.g., durable subscriptions, data about destinations, persistent messages, auditing data) needed by the broker is permanently stored.

Delivery mode: An indicator of the reliability of messaging: whether messages are guaranteed to be delivered and successfully consumed once and only once (persistent delivery mode) or guaranteed to be delivered at most once (non-persistent delivery mode).

Delivery model: The model by which messages are delivered: either point-to-point or publish/subscribe. In JMS, there are separate programming domains for each, using specific client runtime objects and specific destination types (queue or topic), as well as a unified programming domain.

Destination: The physical destination in a Message Queue broker to which produced messages are delivered for routing and subsequent delivery to consumers. This physical destination is identified and encapsulated by an administered object that a client uses to specify the destination for which it is producing messages and/or from which it is consuming messages.

Encryption: A mechanism for protecting messages from being tampered with during delivery over a connection.

Group: The group to which the user of a Message Queue client belongs for purposes of authorizing access to connections, destinations, and specific operations.

Message service: A middleware service that may provide asynchronous, reliable exchange of messages between distributed components or applications. It may include a broker, the client runtime, the several data stores needed by the broker to carry out its functions, and the administrative tools needed to configure and monitor the broker and to tune performance.

Messages: Asynchronous requests, reports, or events that are consumed by messaging clients. A message may have a header (to which additional fields can be added) and a body. The message header specifies standard fields and optional properties. The message body contains the data that is being transmitted.

Messaging: A system of asynchronous requests, reports, or events used by applications that may allow loosely coupled applications to transfer information reliably and securely.

Producer: An object (Message Producer) created by a session that is used for sending messages to a destination. In the point-to-point delivery model, a producer is a sender (Queue Sender); in the publish/subscribe delivery model, a producer is a publisher (Topic Publisher).

Queue: An object created by an administrator to implement the point-to-point delivery model. A queue is available to hold messages even when the client that consumes its messages is inactive. A queue may be used as an intermediary holding place between producers and consumers.

Selector: A message header property used to sort and route messages. A message service may perform message filtering and routing based on criteria placed in message selectors.

Session: A single threaded context for sending and receiving messages. This can be a queue session or a topic session.

Topic: An object created by an administrator to implement the publish/subscribe delivery model. A topic may be viewed as a node in a content hierarchy that is responsible for gathering and distributing messages addressed to it. By using a topic as an intermediary, message publishers may be kept separate from message subscribers.

Transaction: An atomic unit of work that must either be completed or entirely rolled back.

Integration Gateway—Middleware

FIG. 1 illustrates a network 10 including an integration gateway module 12 for enabling communications among a number of heterogeneous components. In one embodiment, the network 10 may comprise a gaming network located within at least partially within a gaming property. However, in other embodiments, the network 10 may comprise any of a variety of intranets, extranets, or other networks.

As illustrated, the heterogeneous components within the network 10 include applications 14, 16, other software components 18, and a number of servers 20a, b, c (collectively 20). The applications 14, 16 and other software components 18 may communicate with the integration gateway 12 via an application programming interface 22 ("API"), while the servers 20 communicate via their respective server interfaces 24a, b, c (collectively 24). In one embodiment, the servers 20 may comprise a plurality of different platforms and may communicate via their respective platform interfaces.

As illustrated, the integration gateway module 12 may be accessible via a computing system 26. As would be well understood by those skilled in the art, the computing system 26 may comprise any of a variety of computers/servers. In one embodiment, the computing system 26 may enable administration and configuration of the integration gateway 12.

The integration gateway 12 allows the components of the network 10 to communicate despite their differences. Thus, these heterogeneous components do not need to be recreated as homogeneous elements. The integration gateway 12, sometimes referred to as "middleware," may enable the software components (e.g., applications, enterprise java beans, servlets, and other components) that have been developed independently and that run on different networked platforms to interact with one another. In some embodiments, the integration gateway 12 resides between the application layer and the platform layer (i.e., the operating system and underlying network services).

Applications distributed on different network nodes (e.g., applications executing on the servers 20) may use the integration gateway 12 to communicate without having to be concerned neither with the details of the operating environments that host other applications nor with the services that connect them to these applications. In addition, an administrative interface may be provided on the computing system 26. This administrative interface may enable personnel working on the network 10 to keep this virtual system of interconnected applications reliable and secure. The performance of the network 10 can also be measured and tuned, and the network 10 may even be scaled without losing function.

In one embodiment, the integration gateway 12 may serve as a single implementation/communication point to communicate with various enterprise products. Each of these various enterprise products (e.g., each of the servers 20) may use industry-specific protocols, like the System to System (S2S) Protocol promulgated by the Gaming Standard Association, in order to communicate with the integration gateway 12. Indeed, a variety of different protocols, including proprietary and standard protocols, may be used to communicate via the integration gateway 12. The integration gateway 12 may also facilitate real-time information access among disparate systems within the network 10, thereby helping to streamline business processes and improve organizational efficiency.

Middleware can be generally grouped into the following categories, which may each be supported by or integrated into the integration gateway 12:

Remote Procedure Call or RPC-based middleware: Such middleware may allow procedures in one application to call procedures in remote applications as if they were local calls. The middleware can implement a linking mechanism that locates remote procedures and makes these transparently available to a caller. This type of middleware may be handled by procedure-based or object-based programs or components.

Object Request Broker or ORB-based middleware: Such middleware may enable an application's objects to be distributed and shared across heterogeneous networks.

Message Oriented Middleware or MOM-based middleware: Such middleware may allow distributed applications to communicate and exchange data by sending and receiving messages.

Each of these categories makes it possible for one software component to affect the behavior of another component over the network 10. They are different in that RPC- and ORB-based middleware may create systems of tightly-coupled components, whereas MOM-based systems may allow for a looser coupling of components. In an RPC- or ORB-based system, when one procedure calls another, the procedure may wait for the called procedure to return before it can do anything else. As mentioned before, in each of these categories, the middleware (i.e., the integration gateway 12, in one embodiment) functions partly as a super-linker, locating the called procedure on the network 10 and using network services to pass function or method parameters to the procedure and then to return results.

Message Oriented Middleware

In general, MOM-based systems may make use of a messaging provider to mediate messaging operations. The basic elements of a MOM-based system are Clients, messages, and the MOM messaging provider, which may include an API and administrative tools. The MOM provider may use a variety of different architectures to route and deliver messages: it can use a centralized message server, or it can distribute routing and delivery functions to each Client machine. Some MOM-based systems combine these two approaches.

Using a MOM-based system, in one embodiment, a Client makes an API call to send a message to a destination managed by the MOM provider. The call invokes provider services to route and deliver the message. Once it has sent the message, the Client can continue to do other work, while the MOM provider retains the message until a receiving Client retrieves it. The message-based model, coupled with the mediation of the MOM provider, makes it possible to create a system of loosely-coupled components. The MOM-based system may therefore be able to continue to function reliably, without downtime, even when individual components or connections fail.

The MOM provider may also include an administrative interface, using which an administrator can monitor and tune performance. Client applications are thus effectively relieved of messaging-related tasks except those of sending, receiving, and processing messages. The MOM-based system and the administrator can work to resolve issues like interoperability, reliability, security, scalability, and performance, without modifying the client applications.

Integration Gateway Overview

The integration gateway 12 may comprise a Java-based MOM solution that allows client applications to create, send, receive, and read messages in a distributed enterprise system, such as network 10. Of course, in other embodiments, the integration gateway 12 may be written in other programming languages, and may run on a variety of platforms. The integration gateway 12 may reduce the complexity of embedding diverse communication protocols within the client applications, making it faster and easier to integrate third-party host/legacy applications with newer products. The integration gateway 12 may also improve the reliability, flexibility and scalability of messaging. The heterogeneous nature of the network 10 may arise from both the technology on which the products in the network 10 are based and/or the protocols that they support to communicate with the other systems.

The integration gateway 12 can play a variety of roles within the network 10: it may comprise a stand-alone product or may be used as an embedded component in a larger distributed runtime system. As a standalone product, the integration gateway 12 may define the backbone of an enterprise application integration system. Embedded in an application server, the integration gateway 12 may support inter-component messaging. For example, J2EE uses a JMS provider to implement message-driven beans and to allow EJB components to send and receive messages. In one embodiment, message mapping/conversion according to the destination requirements may be implemented as a pluggable component. This may enable various channels and products to exchange messages without being concerned about potential incompatibilities.

The integration gateway 12 may provide a number of features/advantages within the network 10: the integration gateway 12 may be flexible, scalable, reliable, and may provide synchronous and asynchronous messaging across various platforms; the integration gateway 12 may provide fast, guaranteed message delivery, receipt notification, transaction control and a data persistence mechanism for multiple products and platforms; the integration gateway 12 may eliminate complexity of embedding communication protocols in business logic; the integration gateway 12 may provide support for cross-platform Clients and servers; the integration gateway 12 may support platform dependent communication protocols, data formats and encoding; the integration gateway 12 may also support for the following messaging models: Publish-Subscribe Messaging, Point-to-Point Messaging, and/or Request-Reply Messaging; the integration gateway 12 may also provide a stand-alone GUI for setup and maintenance, and may support common message formats such as stream, text, and byte.

In one embodiment, the integration gateway 12 may provide a flexible MOM solution, which may be easily customized according to the needs of internal products which differ in technology and in the interfaces used for communication. In another embodiment, the integration gateway 12 may allow legacy systems to communicate (e.g., indirectly via the integration gateway 12) with newer products based on evolving technologies.

Integration Gateway Architecture

Figure 2:
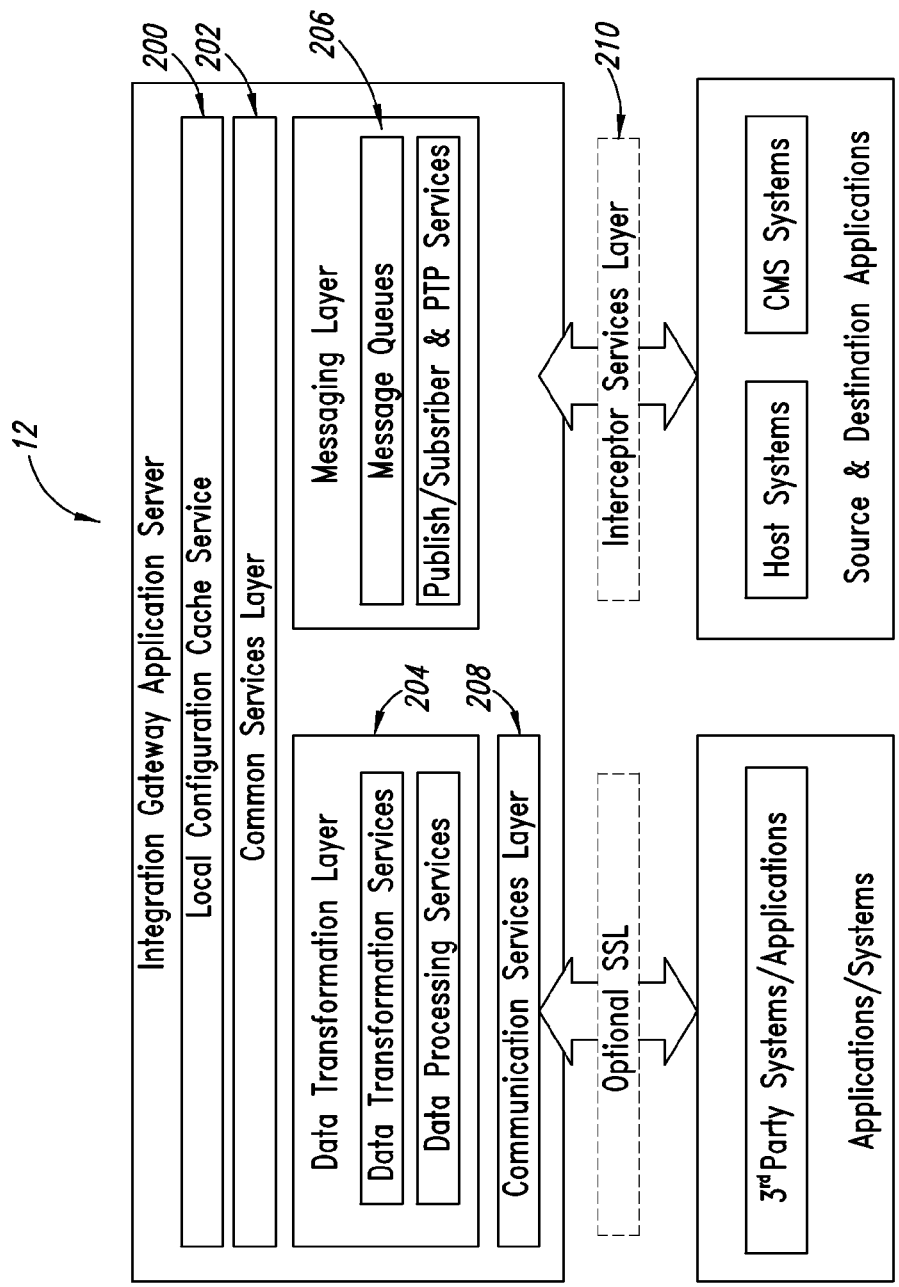
FIG. 2 is a schematic view of one example architecture for the integration gateway of FIG. 1, according to one illustrated embodiment.

FIG. 2 shows one example architecture for the integration gateway 12. As illustrated, the integration gateway 12 may include the following: Local Configuration Cache Services 200, a Common Services Layer 202, a Data Transformation Layer 204, a Messaging Layer 206, a Communication Services Layer 208, and an Interceptor Services Layer 210.

Each of these services comprising the integration gateway 12 is detailed in greater detail in the following sections.

Local Configuration Cache Services

The local configuration cache services 200 represent the services configuration folder structure in the integration gateway 12. This services configuration folder structure may be created during the installation process of the integration gateway 12 and may be used to manage the configurations for each service provided by the integration gateway 12. In one embodiment, the integration gateway 12 does not include a database. Although, in other embodiments, of course, the integration gateway 12 may include one or more databases.

Common Services Layer

The common services layer 202 acts as a common services layer. That is, the common services layer 202 may represent (and provide access to) the common functions used by the integration gateway 12, such as, logging, configuration, database access and other foundation classes.

Data Transformation Layer

The data transformation layer 204 may include code that forms the outlet for custom or platform-specific data manipulation and formatting. This layer 204 may be used for data in both inbound and outbound message Queues. The business logic execution may be based on the message types used. (Example: Responding with an ACK message in the S2S protocol for incoming messages.)

In one embodiment, the data transformation layer 204 supports the following data types: Simple Strings, XML (Complex), Files, Images & Bitmaps (Byte Streams), and Serializable Objects (Marshal By Value). In other embodiments, of course, other data types may be supported.

The data transformation layer 204 may also support the following data encoding options: ASCII, EBCDIC, and UTF-8. Again, in other embodiments, other data encoding options may be supported.

Messaging Layer

In one embodiment, the messaging layer 206 acts as a central layer for the integration gateway 12, and enables the management of messages and objects for inter-application communication. The messaging layer 206 may be designed based on Publisher/Subscriber or Point-to-Point (Asynchronous) messaging models utilizing JMS Topics (Producer/Consumer Object classes). The messaging layer 206 may also use the Request/Response (Synchronous) model using JMS Queues.

In one embodiment, the messaging layer 206 may enable message persistence using Durable Topics/Queues, and may enable the administration of integration gateway services using a stand-alone user interface. The messaging layer 206 may also enable configuration of certain services (e.g., Publisher/Subscriber and Point-to-Point) using the stand-alone user interface. Finally, the messaging layer 206 may include failover and load-balancing, which may be implemented using Sun Java System Message Queue 4 2005Q1 Enterprise Edition.

Messaging Domains

Generally, the integration gateway 12 (and, in particular, the messaging layer 206) may allow components and applications to communicate by producing and consuming messages. The integration gateway 12 defines two patterns or messaging domains that govern this communication. These messaging domains are Point-to-Point Messaging and Publish/Subscribe Messaging (as described above). The integration gateway 12 may be configured to support either or both of these patterns. The basic integration gateway objects include connections, sessions, Producers, Consumers, destinations, and messages that are used to specify messaging behavior in both domains.

Point-to-Point Messaging

In the Point-to-Point domain, message Producers are called Senders and Consumers are called Receivers. The senders and receivers may exchange messages by means of a destination called a Queue: senders produce messages to the Queue, and receivers consume messages from the Queue.

Point-to-Point messaging may provide a number of features. First, more than one Producer may be allowed to send messages to a Queue. Such Producers can share a connection or use different connections, even though they may all access the same Queue. Second, more than one Receiver may be allowed to consume messages from a Queue. However, in one embodiment, each message can only be consumed by one Receiver. Thus Msg1, Msg2, and Msg3 will be consumed by different Receivers. Third, Receivers can share a connection or use different connections, but they may all access the same Queue. Fourth, the sending and receiving of messages via Point-to-Point messaging may be enabled with no timing dependencies. Thus, a Receiver can fetch a message even if it was running when the Client sent the message. Fifth, Senders and Receivers may be added and deleted dynamically at runtime. This feature may allow the integration gateway 12 to expand or contract as needed. Sixth, messages may be placed on the Queue in the order sent, but the order in which they are consumed may depend on factors such as message expiration date, message priority, and whether a selector is used in consuming messages.

The Point-to-Point domain may also offer certain advantages. For example, the fact that multiple Receivers can consume messages from the same Queue may allow effective load-balancing of message consumption, as long as the order in which messages are received is not important. As another example, messages destined for a Queue may be retained, even if there are no Receivers. Finally, Clients may be able to use a Queue browser object to inspect the contents of a Queue. The Clients can then consume messages based on the information gained from this inspection. That is, although the consumption model is normally FIFO (first in, first out), in some embodiments, Clients can consume messages that are not at the head of the Queue if they know what messages they want based at least in part on message selectors. Administrative Clients may also use the Queue browser to monitor the contents of a Queue.

Publish/Subscribe Messaging

In the Publish/Subscribe domain, message Producers are called Publishers, and message Consumers are called subscribers. The Publishers and Subscribers may exchange messages by means of a destination called a topic: Publishers produce messages to a topic, and Subscribers subscribe to a topic and consume messages from a topic.

The subscribers to these topics can be non-durable or durable. The Broker may be configured to retain messages for all active subscribers, but it may be configured to only retain messages for inactive subscribers if these subscribers are durable.

In the Publish/Subscribe domain, more than one Producer may be allowed to publish messages to a topic. Such Producers can share a connection or use different connections, but they may all access the same topic. In some embodiments, more than one subscriber can consume messages from a topic. The subscribers may retrieve all of the messages published to a topic unless they use selectors to filter out messages or the messages expire before they are consumed. Subscribers can also share a connection or use different connections, but they may all access the same topic. As described above, durable subscribers can be active or inactive. However, even when a durable subscriber is inactive, the Broker may be configured to retain messages for them. Publishers and subscribers may be added and deleted dynamically at runtime, thus allowing the integration gateway 12 to expand or contract as needed. In one embodiment, messages are published to a topic in the order sent, but the order in which they are consumed depends on factors such as message expiration date, message priority, and whether a selector is used in consuming messages. Publication and subscription may include a timing dependency. For example, a topic subscriber may be able to consume only those messages published after it has created the subscription.

In some embodiments, the Publish/Subscribe domain may allow message to be broadcast to subscribers.

A session object may be used to create a Durable Subscriber to a topic. The Broker may then retain messages for such subscribers even when the subscriber becomes inactive.

In some embodiments, because the Broker must maintain the state for the subscriber and resume delivery of messages when the subscriber is reactivated, the Broker can identify a given subscriber during its comings and goings. The subscriber's identity may be constructed from a Client ID, a property of the connection that created the subscriber, and a subscriber name specified at the time of its creation. Other means of identifying the subscriber may be used in different embodiments.

Communication Services Layer

The Communication Services Layer 208 may serve as the primary layer responsible for inter-system communication. Message integrity may be achieved with ACK/NAK messaging architecture, while the Keepalive supports a real-time Request/Response message protocol.

The Web services provided by the Communication Services Layer 208 may enable communication among different products produced by different companies.

For example, communication between a Third Party Debit Ticket Kiosk system and ACSC for the Ticket number sequence may be enabled. In such an embodiment, the Debit Ticket Kiosk may send out messages using the S2S protocol to the integration gateway 12, and the integration gateway 12 can then communicate with ASCS, obtain a response and form an S2SMessage to send back to Debit Ticket Kiosk.

The Web Services may use message processor plug-ins to translate messages into the format required by the requested system.

In one embodiment, the communication services layer 208 may support the following protocols: Basic low-level Client/Server TCP/IP sockets, Secure File Transfer Protocol (SFTP), HTTP/HTTPS, SOAP (e.g. using Apache Axis2), .NET Remoting using IIOP ORB protocol, RMI (EJB), and Database Stored Procedures. Of course, in other embodiments, additional protocols, including proprietary protocols, may be supported by the communication services layer 208.

Interceptor Services Layer

The Interceptor Services Layer 210 may serve as a lightweight middleware object in the integration gateway 12 that coexists with applications and/or systems (e.g., applications and systems distributed by Bally Gaming) utilizing the integration gateway services. This layer 210 may communicate with the local application using simple Java programs, RMI, IIOP and/or database stored procedures.

Programming Objects

In one embodiment, the objects used to implement messaging by the integration gateway 12 may remain essentially the same across programming domains. These objects may include—Connection Factories, Connections, Sessions, Producers, Consumers, Messages, and Destinations. Table 1, below, summarizes exemplary steps for sending and receiving messages. Note that steps 1 through 6 are the same for senders and receivers.

TABLE 1

| Producing a Message | Consuming a Message |
| --- | --- |
| 1. The administrator creates a connection factory administered object. | |
| 2. The administrator creates a physical destination and the administered object that refers to it. | |
| 3. The client obtains a connection factory object through a JNDI lookup. | |
| 4. The client obtains a destination object through a JNDI lookup. | |
| 5. The client creates a connection and sets any properties that are specific to this connection. | |
| 6. The client creates a session and sets the properties that govern messaging reliability. | |
| 7. The client creates a message Producer. | The client creates a message Consumer. |
| 8. The client creates a message. | The client starts the connection. |
| 9. The client sends a message. | The client receives a message. |

The following sections describe objects that may be used by Producers and Consumers, such as the Connections, Sessions, Messages, and Destinations. A description of the production and consumption of messages follows.

Connection Factories and Connections

In one embodiment, a Client uses an object (e.g., a Connection Factory) to create a connection. The connection object (i.e., Connection) represents a Client's active connection to the Broker. It may use an underlying connection service that is either started by default or explicitly started by the administrator for this Client.

The allocation of communication resources and authentication of the Client may take place when a connection is created. The Connection may comprise a relatively heavyweight object, and Clients may do all their messaging with just a single connection. In some embodiments, Connections support concurrent use, i.e., any number of Producers and Consumers can share a connection.

When a connection factory is created, the behavior of all connections derived from it may be configured by setting the properties of the connection factory. For example, for a Message Queue, the following information may be specified: the name of the host on which the Broker resides, the connection service desired, and the port through which the Client can access the service; how to handle automatic reconnection to the Broker if a connection fails (This feature may reconnect the Client to the same Broker (or to a different Broker) if a connection is lost. Data failover may not be guaranteed as persistent messages and other state information may be lost when reconnecting to a different Broker.); the ID of Clients that need the Broker to track durable subscriptions; the default name and the password of a user attempting the connection (This information may be used to authenticate the user and to authorize operations if a password is not specified at connection time.); whether Broker acknowledgements should be suppressed for those Clients who are not concerned with reliability; how to manage the flow of control and payload messages between the Broker and the Client runtime; and whether certain message header fields should be overridden.

Sessions

If a connection represents a communication channel between a Client and a Broker, a session may designate a single conversation between the Client and Broker. The session object may be used to create messages, message Producers, and message Consumers. When a session is created, reliable delivery may be enabled through a number of different acknowledgement options or through transactions.

A session may comprise a single-threaded context for producing and consuming messages. Multiple message Producers and message Consumers may be created for a single session, but a restriction may be instituted to use these message Producers and message Consumers serially. A session object may also be used to do the following: create and configure destinations for those Clients that do not use administered objects to define destinations; create and configure temporary topics and Queues (These topics and Queues may be used as part of the request-reply pattern (discussed in greater detail below).); support transaction processing; define a serial order for producing or consuming messages; and/or serialize the execution of message listeners for asynchronous Consumers.

Messages

In one embodiment, each message is composed of three parts: a header, the header's properties, and a body.

The message header may be a requirement for every valid message. The header may, inter alia, contain the following exemplary fields, set forth in Table 2.

TABLE 2

| Header Field | Description |
| --- | --- |
| Destination | Specifies the name of the destination object to which the message is sent. (Set by the provider.) |
| Expiration | Specifies the time when the message will expire. (Set by default by the provider or by the client for a Producer or for an individual message.) |
| Priority | Specifies the priority of the message within a range (e.g., 0 - low to 9 - high). (Set by default by the provider or set explicitly by the client for a Producer or for an individual message.) |
| Timestamp | Specifies the time when the provider received the message. (Set by the provider.) |
| Type | A value that can be evaluated by a message selector. (Set by the client if needed.) |

Another field that may be used is a Delivery Mode field, which may determine the reliability of message delivery. This field may indicate whether a given message is persistent.

The message body contains the data that Clients want to exchange. The type of message may determine the contents of the message body as well as how the message body should be processed by the consumer. Some exemplary types are set forth in Table 3. The Session object may include a create method for each type of message body.

TABLE 3

| Type | Description |
| --- | --- |
| Stream Message | A message with a stream of primitive values in its body. It is filled and read sequentially. |
| Map Message | A message with a set of name-value pairs in its body. The order of the entries is not defined. |
| Text Message | A message with a string in its body, such as an XML message. |
| Object Message | A message with a serialized Java object in its body. |
| Bytes Message | A message with a stream of uninterrupted bytes in its body. |
| Message | A message that contains a header and properties but no body. |

Java Clients may be configured to set a property so that the Client runtime compresses the body of a message being sent. The Message Queue runtime on the consumer side may then decompress the message before delivering it.

Producing a Message

In one embodiment, messages may be sent or published by a message Producer, within the context of a connection and/or session. In one embodiment, a Client uses a message Producer object (Message Producer) to send messages to a physical destination, represented in the API as a destination object.

When a Message Producer is created, a default destination may be specified to which all the Message Producer's messages will be sent by default. Default values for the message header fields that govern persistence, priority, and time-to-live may also be specified. These default values may then be used by all messages issued from that Producer unless they are over-ridden. In one embodiment, these default values may be easily over-ridden, if, for example, an alternate destination is specified when sending a message, or if alternate values for the header fields are entered for a message.

Consuming a Message

The messages produced above may be received by a message consumer, within the context of a connection and/or session. In one embodiment, the client uses a message consumer object (Message Consumer) to receive messages from a specified physical destination, represented in the API as a destination object.

In one embodiment, three factors may affect how the Broker delivers messages to a consumer: (1) whether consumption is synchronous or asynchronous; (2) whether a selector is used to filter incoming messages; and (3) if messages are consumed from a topic destination, whether the subscriber is durable.

Another factor that may affect message delivery and client design is the degree of reliability needed for the consumer.

Exemplary Messaging Process Flow

Figure 3:
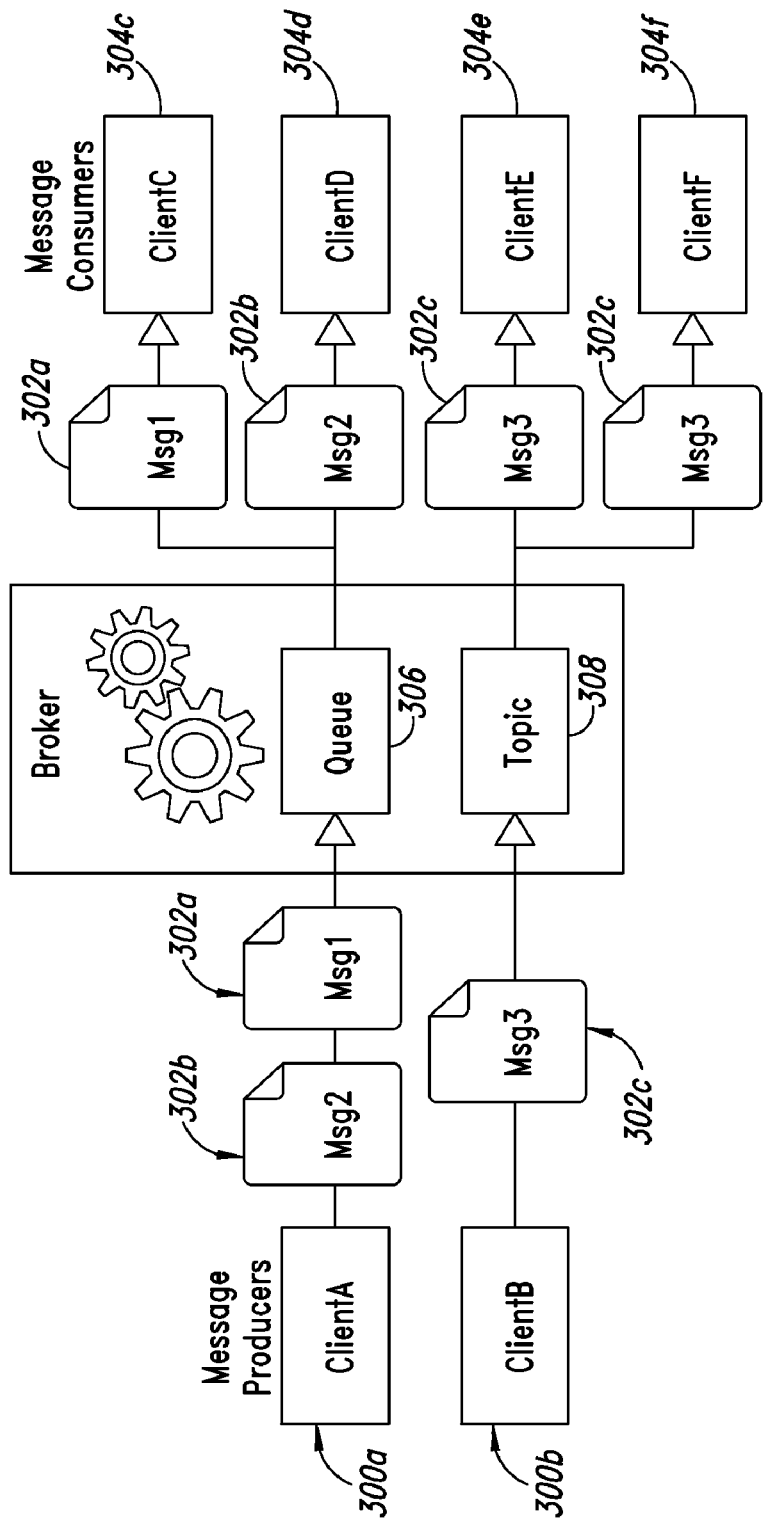
FIG. 3 is a process flow showing a messaging process, according to one illustrated embodiment.

Referring to FIG. 3, one exemplary messaging process is illustrated. As illustrated therein, client A 300a and client B 300b are message Producers, sending messages 302a, b, c (collectively 302) to client C 304c, client D 304d, client E 304e, and client F 304f by way of two different kinds of destinations.

Messaging between clients A, C, and D 300a, 304c, 304d illustrates a Point-to-Point pattern. Using this pattern, client A 300a may send a message Msg1 302a or Msg 2 302b to a Queue destination 306 from which only one of the Receivers 304c, 304d may get it. In the illustrated embodiment, each message may be received by only one receiver, and no other receiver accessing the Queue destination 306 can get that message.

Messaging between clients B, E, and F 300b, 304e, 304f illustrates a Publish/Subscribe pattern. Using this broadcast pattern, client B 300b may send a message Msg3 302c to a Topic destination 308 from which both consuming subscribers 304e, 304f can retrieve it. Each subscriber 304e, 304f may obtain its own copy of the message 302c.

Asynchronous/Synchronous Communication

Message Consumers in either the Point-to-Point or Publish/Subscribe domains may choose to get messages synchronously or asynchronously. Synchronous Consumers may be required to make an explicit call to retrieve a message, while asynchronous Consumers may specify a callback method that is invoked to pass a pending message. In some embodiments, consumers can also filter out messages by specifying selection criteria for incoming messages.

Asynchronous communication can be defined as communication where one party simply sends a message to another. Problems may arise when the sending party expects a response to the message, or when the timeframe during which a sending entity can remember that it sent a message and that it expects a reply is short.

Synchronous communication can be defined as communication where one party has a conversation with another. This may be presented as a request-response scenario. An interface may be defined between two Objects or Services where an invocation results in a response once the requested processing has been completed. Indeed, in some embodiments, even if there is no actual response, a void response may be required.

Services

In one embodiment, the integration gateway 12 provides support for the following protocol definitions, discussed in greater detail below: Database Interface; DotNet Client; DotNet Server; FTP Get; FTP Put; HTTP Get; HTTP Post; iSeries Data Queue Writer; iSeries Data Queue Reader; Object Serializer; Object Deserializer; RMI Client DotNet Server; RMI Server DotNet Client; Socket Server; Socket Multiplexer; Socket Relay Client; Socket Client; S2S Message Client; S2S Message Service; S2S Voucher End of Day Report Service. These services and related protocols may facilitate intersystem communication and message processing.

Database Interface

This protocol may be used to create a service that communicates with a database by making a stored procedure call. The service can take configurable parameters for connecting and executing a stored procedure on a database. It can then pass an entry to the host in alphanumeric form and then get a response too in alphanumeric form.

Apart from the database connection parameters, the following parameters may also be configurable: Source Event (the point on the Queue where the service listens for incoming messages); and Destination Event (the point on the Queue where the stored procedure reply is written).

In one embodiment, the service created listens to an event on a Queue associated with the integration gateway 12. When a message arrives in the Queue, if configured, the service may then process the message and pass it on to the stored procedure. If the stored procedure returns a response, the response is then written back to the Queue at an event configured as its destination.

All database connection parameters, such as Source Event and Destination Event, may be configurable on a user interface of the integration gateway 12 while creating a Database Interface service.

DotNet Client and Server

In one embodiment, the DotNet protocols may use IIOP (Internet Inter-ORB Protocol) to communicate with a .NET Remoting server and/or a .NET Remoting Client. .NET Remoting is a feature of Microsoft's DotNet that provides RPC/RMI-like capabilities.

IIOP is a protocol that enables distributed programs written in different programming languages to communicate over the Internet. IIOP forms a part of the industry standard, Common Object Request Broker Architecture (CORBA).

In one embodiment, the DotNet Client service listens to a Queue associated with the integration gateway 12. When a message arrives, the service may access a remote object on a DotNet system (e.g., a .NET Remoting Server) by passing that message as a parameter to the method on that object. In some embodiments, the following parameters may be configured for the DotNet Client service: Context Provider URL (the factory for ORB API), and Object URI (the URI of the object exposed on the .NET Remoting Server).

The DotNet Server service may allow a DotNet system (e.g., a .NET Remoting Client) to access an object exposed via the integration gateway 12, by passing a message as a parameter to the method on this object. The DotNet Server service may then write to a Queue associated with the integration gateway 12 on the configured event. In some embodiments, the following parameters may be configured for the DotNet Server service: Context Provider URL (the factory for ORB API), and Object URI (the URI of the object exposed on the integration gateway Server).

FTP Get & Put

The FTP Get Service may be used to poll a remote directory periodically using the File Transmission Protocol (FTP). Once any new and relevant file is found, the service can then download the file and write the file object to a Queue associated with the integration gateway 12. The Queue may be monitored by other programs (e.g., by FTP Put), which may retrieve the file object from the Queue.

The FTP Put Service may be used to listen to Message Events of the Queue. Once a message is written to the Queue, the service may check whether it is a file object. If so, the FTP Put service may retrieve and upload the file to an FTP Server.

HTTP Get & Post

The HTTP Post service may send the data of a file in a local file system to a configured http server. The HTTP Post request can also send additional data to the host server, which may be specified after the URL, the headers, and a blank line to indicate the end of the headers.

The HTTP Get service may be used to download files from the configured http Server to the local file system.

In some embodiments, these HTTP services may also provide other processing options, e.g., by marking the downloaded/uploaded files by deleting or renaming the files.

iSeries Data Queue Reader/iSeries Data Queue Writer

These services may be included to allow writes/reads to/from iSeries Data Queues. The iSeries Data Queue Reader service may be configured to read messages from an iSeries Data Queue and write them to the Queue associated with the integration gateway 12. The iSeries Data Queue Writer service may be configured to listen to the Queue associated with the integration gateway 12, and, when a message is received, write that message to an iSeries Data Queue.

In some embodiments, a variety of iSeries Data Queue access parameters may be configured on a user interface of the integration gateway 12. For example, the iSeries Data Queue service may be configured for the following: iSeriesDataQueueRx, and iSeriesDataQueueTx.

RMI Server DotNet Client & RMI Client DotNet Server

These RMI-related protocols may enable a Java system and a DotNet system to communicate using RPC based on IIOP.

The difference between the RMI Server/Client DotNet protocols and other DotNet protocols described herein is that these RMI protocols may be designed so as not to include a Queue concept. Thus, these RMI Server/Client DotNet protocols may be used for synchronous, inter-system communication.

Object Serializer/Deserializer

Object Serialization is the process of saving an object's state to a sequence of bytes, and may also be used to describe the process of rebuilding those bytes into a live object at a later point in time. In the integration gateway 12, the Object Serializer service may allow all of the files in a selected directory (e.g., a source directory) to get serialized and may then write the object form of these files to the Queue associated with the integration gateway 12.

The Object Deserializer service that resides on the Queue may listen for Object messages and may deserialize them into files in a configured path.

Socket-Based Services

Sockets are interfaces that can "plug into" each other over a network, such as network 10. Once "plugged in", the programs or software components so connected can communicate with each other. A socket represents a single connection between exactly two pieces of software. When more than two pieces of software communicate in client/server or distributed systems (for example, many web browsers simultaneously communicating with a single web server), multiple sockets may be required. Socket-based software may execute on two separate computers on the network 10; however, sockets can also be used to communicate locally (i.e., inter-process) on a single computer. Various socket-based services may be made available on the network 10 via the integration gateway 10.

Sockets may be bi-directional, i.e., either side of the connection is capable of sending and receiving data. The application that initiates communication may be termed the client, and the other application may be termed the server.

TCP/UDP

There are two types of Internet Protocol (IP) traffic, described generally in Table 4. These two types of traffic may have very different uses.

network 10. The socket server may then perform operations based on those requests, and then possibly return results to the requester.

In some embodiments, this protocol enables different socket behaviors based on two configuration parameters: the parameter 'Listener', and the parameter 'Full Duplex'. The parameter 'Listener' is a Boolean parameter and may cause the socket to act as a server. If set to true, the socket waits for requests, and accepts connections. If set to false, the socket may connect to an external server socket on the network 10.

The parameter 'Full Duplex' is a Boolean parameter related to two-way communication on the same line. When set to true, the socket may behave in a two-way fashion. When the Full Duplex parameter is configured to true, a 'Full Duplex Event' value may also be configured in order to identify the point where the service listens to the Queue of the integration gateway 12 for incoming messages. This value may be written to the socket. If the Full Duplex parameter is set to false, the communication is one way. That is, the socket listens at a port and writes the incoming message to the Queue associated with the integration gateway 12 at the specified point configured in 'Request Event'.

The Full Duplex parameter may be used to define the type of communication between the Queue and the Socket Server Service. However, irrespective of the Full Duplex value, a socket may be configured to send or receive data.

Socket Multiplexer

For the socket multiplexer service, the integration gateway 12 may enable configuration of the following parameters: port number IP (IP address where the server socket will be opened); multiplexer ports (a list of values, each value in the format of 'IPaddress: Port'; the assumption being that server sockets are listening at all of these ports at the corresponding IP address); and single pipe (when set to true, the conversation ends with a single request/response scenario, the Client socket is closed, and looped for the next Client connection).

The socket multiplexer service may be configured to open a server socket at the specified IP address and port and listen for incoming connections. When a Client connects, the incoming messages may be routed to a list of server sockets (configured by the parameter 'multiplexer ports') sequen-

TABLE 4

| Transmission Control Protocol (TCP) | User Datagram Protocol (UDP) |
|---|---|
| TCP is a connection-oriented protocol, a connection can be made from client to server, and from then on, any data can be sent along that connection. | A simpler message-based connectionless protocol. With UDP, you send messages (packets) across the network in chunks. |
| Reliable - When a message is sent along a TCP socket, the message will reach its destination unless the connection fails completely. If so, the server will send a request for the lost portions of the file again. | Unreliable - Message receipts are not guaranteed. The messages may or may not be transmitted. |
| Ordered - Messages are sent and listed in the order in which they are sent. | Not ordered - Messages sent may not be listed in the order in which they are sent. |
| Heavyweight - When the low-level parts of the TCP "stream" arrive in the wrong order, requests must be re-sent, and all of the out of sequence parts must be put back together before sending them. | Lightweight - There is no ordering of messages, no tracking connections, etc. It is often quicker, and the network card/operating system have little work to do in translating data back from the packets. |

For socket-based protocols, the integration gateway 12 may allow configuration of the type of the protocol, i.e., whether it is TCP or UDP.

Socket Server

Once a socket server service is started, a server socket may wait at the configured port for requests to come in over the tially. The first message to the first socket, the second message to the second socket, and so on.

In some embodiments, this service will help with load balancing in a high message traffic scenario.

Socket Relay Client

The socket relay client service may constitute two threads: Receiver and Transmitter. These two threads may enable two-way communication between a server socket and a regular socket. Each of these threads may be configured to read from one socket and write to another socket, which may help in controlling traffic between the two sockets.

Socket Client

Socket client services may listen to the Queue of the integration gateway 12. When a message is received, the socket client service writes to the configured IP address and port number. In some embodiments, a 'Listener' value can be configured to obtain Server Socket attributes. The period of delay in sending the acknowledgment after sending the message may also be configured using the parameter 'ackWait'. If an acknowledgement is not received within the scheduled time, the message may be re-sent.

All of the socket services discussed above may also include other values that can be configured, such as: Start of Message (SOM); End of Message (EOM); and/or Acknowledgment Message (ACK).

S2S Protocol

The System to System (S2S) Messaging standard set by the Gaming Standard Association provides a set of communication protocols between gaming host systems (e.g., accounting, security, progressive controllers, advertising, and promotion displays), as well as between gaming and non-gaming host systems. This S2S standard has emerged as a hospitality-gaming industry solution. The current version of the S2S standard includes support for the following types of gaming and non-gaming communications: patron registration; player ratings (e.g., with respect to table games, slots, bingo, keno, poker, sports book); table games accounting (hourly estimates, open and closing, fills and credits, marker and chip purchase vouchers support); comps (e.g., complimentary awards, points, money, or hospitality products); system, data and device configurations (such as defining active/inactive game types and calculations, progressive controllers, chip sets, regional settings, shifts, or codes for particular types of data, such as club or badge identifiers).

S2S Message Service

The S2S Message Service on the integration gateway 12 may comprise a web service that is exposed to Clients who want to communicate using the S2S protocol. Both synchronous and asynchronous versions of S2S may be supported. An interceptor value may be configured based on the synchronous or asynchronous nature required. An interceptor may function as an entry point to the integration gateway 12 for the incoming messages over the network 10, and it may also handle the message processing tasks required for requests and responses. This message processing may even include translations performed for messages according to the target system requirements. In one embodiment, the following interceptors may be supported:

Asynchronous Interceptor: This interceptor may write incoming messages to a socket, which in turn writes the message to the Queue of the integration gateway 12. This interceptor may be configured to achieve asynchronous S2S attributes.

Database Interceptor: This interceptor may make a stored procedure call using the configured database connection parameters and return a response.

Java Interceptor: This interceptor may make a Java RMI call to a remote method for which the message is sent as a parameter, in order to receive a response.

DotNet Interceptor: This interceptor may access an exposed object on a .Net Remoting server to access a remote method by passing the message as a parameter.

iSeries Interceptor: This interceptor may make a call to a service program written on iSeries.

S2S Message Client

The S2S message client service may be configured to listen to the Queue for S2S responses and then write these S2S responses to a Web Service Client. The target URL may be configured as a parameter in some embodiments.

S2S End of the Day Voucher Report Service

For Debit Ticket Kiosk functionality, a Client may generate a request for a report that lists the ticket details for tickets issued during the current day. A corresponding S2S message may contain login details to the remote host and the required report name. The integration gateway 12 can then perform S2S translations to generate a flat string message for ACSC.

ACSC may then respond with the link of the server to the integration gateway 12, which, in turn, may use FTP to download the report from the identified server. The downloaded report may then be translated to S2S format and returned to the Client.

Service Settings on GUI

The integration gateway 12 may allow the creation of multiple groups and services based on the application and requirements. In one embodiment, the groups may be logically named. Groups and services may also be created within the groups. In one embodiment, the same service may exist multiple times in the same group; however, it may have to be renamed. The following actions can be performed for each service: Start Service (used to start a selected service); Stop Service (used to stop a selected service); Configure Service; Save Service (used to save a service selected after the configuration); and Delete Service (used to remove a selected service).

The services may be configured in a variety of ways, depending on the Identity, Message, Filter and Client within a group. These settings may be common to all of the different service/protocol settings.

Identity On The GUI

In one embodiment, an Identity tab displayed in the graphical user interface ("GUI") of the integration gateway 12 may be used to name and describe the services and their respective characteristics. For example, the Identity tab may be used to access the Log, Process, Persistence, Acknowledgement and Transaction settings described below.

Log

The integration gateway 12 may provide a logging facility to trace the run time of services. These logging facilities may log information at various levels, such as the Engine, Service & Message levels. For each service, the log level may be set independently according to information requirements.

The following types of messages may be made available in the Log files: All (all messages); Debug (messages generated during debugging); Info (information messages, excluding Debug messages); Warning (all warning messages excluding debug and information messages); and Error (only error messages).

Process

The process configuration on the integration gateway 12 may allow the runtime of each service to be independently controlled. Using a Priority field, the priority for each service may be defined. This priority setting may help in identifying those service threads that should execute prior to other configured service threads. The default priority for each service may be set to five (i.e., the "normal priority"). One may be set to the highest priority, and ten to the lowest priority. The service pause time may also be defined via this process configuration.

Persistence

Persistence configuration may enable the definition of the Request and Response Event names for the service. These names, in turn, may determine the location of the respective message destinations on the JMS Queue.

The Response event may be configured for a number of services, such as: Database Interface; DotNet Client; DotNet Interceptor; Database Interceptor; S2S Message Client; and/or S2S Voucher End Of Day Report Service.

Acknowledgment Modes

An acknowledgment mode may also be configured to determine the way a service handles the exchange of acknowledgment information when receiving messages from the Queue associated with the integration gateway 12. In one embodiment, the services may be configured to have any of four possible acknowledgment modes:

Auto-Acknowledge: In Auto-Acknowledge mode, the client runtime sends a Client acknowledgment instantly for each message it delivers to the message consumer. The client runtime may then block, waiting for a return Broker acknowledgment confirming that the Broker has received the Client acknowledgment. This acknowledgment "handshake" between the Client and the Broker may be handled automatically by the Client runtime.

Client-Acknowledge: In Client-Acknowledge mode, the Client application must explicitly acknowledge the receipt of all messages. This enables the deferment of acknowledgment until after the Client application has finished processing the message, ensuring that the Broker will not delete it from persistent storage before processing is complete.

Dups-OK-Acknowledge: In Dups-OK-Acknowledge mode, the session automatically sends a Client acknowledgment each time it has received a fixed number of messages, or when a fixed time interval has elapsed since the last acknowledgment was sent. (This fixed batch size and timeout interval may be set to 10 messages and 7 seconds, respectively, but may also be configured differently. In one embodiment, however, the client may not itself configure the batch size or timeout interval.) Unlike in the first two acknowledgment modes described above, the Broker may not acknowledge receipt of the Client acknowledgment, and the session thread does not block awaiting such return acknowledgment from the Broker. Thus, there may be no way to confirm that the Client acknowledgment has been received, and, if that acknowledgment has been lost in transmission, the Broker may redeliver the same message more than once.

No-Acknowledge: In No-Acknowledge mode, the Client application does not acknowledge receipt of messages nor does the Broker expect any such acknowledgment. In this mode, there may be no guarantee that any message sent by the Broker has been successfully received. This mode thus sacrifices reliability for maximum message traffic throughput.

Transactions

By enabling transactions, an entire series of incoming and outgoing messages may be grouped together, such that they may be treated as an atomic unit. The message Broker (e.g., the integration gateway 12) may then track the state of the transaction's individual messages, but may be configured to not complete their delivery until the transaction as a whole is committed. In the event of a failure, the transaction may be rolled back, canceling all of the associated messages and restarting the entire series from the beginning.

A transacted session may be defined to have exactly one open transaction, encompassing all messages sent or received since the session was created or the previous transaction completed. Committing or rolling back a transaction ends that transaction and automatically begins another.

Message Settings on GUI

In one embodiment, the Message settings associated with the integration gateway 12 may allow the configuration of Data transformational parameters.

Message Configurations

In one embodiment, the Message Processor Plug-ins for Request and Response messages may be configured. Other message settings may also be configured, such as: message type (e.g., string, xml, etc.). Messages may also be prioritized according to a particular 'type' field of the message. This prioritization may help in filtering the messages that should be processed before other messages. Message scheduling may also be used to define the time for processing a given message. For more information on possible configurations that may be made using the user interface of the integration gateway 12, the User Guide for the Bally Integration Gateway (p. 38 et seq.) may be consulted. This User Guide provides some exemplary user interface examples and examples regarding how one example integration gateway may be implemented.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The various embodiments described above can be combined to provide further embodiments. To the extent that they are not inconsistent with the specific teachings and definitions herein U.S. patent publication No. 2008/0162729A1; U.S. patent publication No. 2007/0082737A1; U.S. patent publication No. 2007/0006329A1; U.S. patent publication No. 2007/0054740A1; U.S. patent publication No. 2007/01111791; U.S. provisional patent application Ser. No. 60/865,345, filed Nov. 10, 2006, entitled "COMPUTERIZED GAME MANAGEMENT SYSTEM AND METHOD"; U.S. provisional patent application Ser. No. 60/865,575, filed Nov. 13, 2006, entitled "COMPUTERIZED GAME MANAGEMENT SYSTEM AND METHOD"; U.S. provisional patent application Ser. No. 60/865,332, filed Nov. 10, 2006, entitled "DOWNLOAD AND CONFIGURATION SERVER-BASED SYSTEM AND METHOD"; U.S. provisional patent application Ser. No. 60/865,550, filed Nov. 13, 2006, entitled "DOWNLOAD AND CONFIGURATION SERVER-BASED SYSTEM AND METHOD"; U.S. nonprovisional patent application Ser. No. 11/938,121, filed Nov. 9, 2007, entitled "GAMING SYSTEM DOWNLOAD NETWORK ARCHITECTURE"; U.S. nonprovisional patent application Ser. No. 11/938,228, filed Nov. 9, 2007, entitled "GAMING SYSTEM CONFIGURATION CHANGE REPORTING"; U.S. nonprovisional patent application Ser. No. 11/938,155, filed Nov. 9, 2007, entitled "REPORTING FUNCTION IN GAMING SYSTEM ENVIRONMENT"; U.S. nonprovisional patent application Ser. No. 11/938,190, filed Nov. 9, 2007, entitled "SECURE COMMUNICATIONS IN GAMING SYSTEM"; U.S. nonprovisional patent application Ser. No. 11/938,163, filed Nov. 9, 2007, entitled "METHODS AND SYSTEMS FOR CONTROLLING ACCESS TO RESOURCES IN A GAMING NETWORK"; U.S. nonprovisional patent application Ser. No. 11/938,150, filed Nov. 9, 2007, entitled "NETWORKED GAMING ENVIRONMENT EMPLOYING DIFFERENT CLASSES OF GAMING MACHINES"; U.S. nonprovisional patent application Ser. No. 11/938,231, filed Nov. 9, 2007, entitled "DOWNLOAD AND CONFIGURATION SERVER-BASED SYSTEM AND METHOD WITH STRUCTURED DATA"; U.S. nonprovisional patent application Ser. No. 11/938,225, filed Nov. 9, 2007, entitled "PACKAGE MANAGER SERVICE IN GAMING SYSTEM"; U.S. patent application Ser. No. 11/278,937, filed Apr. 6, 2006, entitled "LOGIC INTERFACE ENGINE SYSTEM AND METHOD"; U.S. Provisional Patent Application Ser. No. 60/676,429, filed Apr. 28, 2005, entitled "LOGIC INTERFACE ENGINE SYSTEM AND METHOD"; U.S. patent application Ser. No. 11/470,606, filed Sep. 6, 2006 entitled "SYSTEM GAMING"; U.S. Provisional Patent Application Ser. No. 60/714,754, filed Sep. 7, 2005, entitled "SYSTEM GAMING APPARATUS AND METHOD"; U.S. Provisional Patent Application No. 60/865,332, filed Nov. 10, 2006, entitled "DOWNLOAD AND CONFIGURATION SERVER-BASED SYSTEM AND METHOD"; and U.S. Provisional Patent Application No. 60/865,396, filed Nov. 10, 2006, entitled "DOWNLOAD AND CONFIGURATION CAPABLE GAMING MACHINE OPERATING SYSTEM, GAMING MACHINE, AND METHOD" are incorporated herein by reference, in their entirety. Aspects of the embodiments can be modified, if necessary, to employ systems, circuits and concepts of the various patents, applications and publications to provide yet further embodiments.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms of taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD-ROMs, digital tape, and computer memory; and transmission type media such as digital and analog communication links using TDM or IP based communication links (e.g., packet links).

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A casino gaming environment integration gateway server computer that provides enterprise-wide services to a plurality of networked processor-based client devices including at least some networked processor-based casino gaming devices, the casino gaming environment integration gateway server computer comprising:
   at least a one processor; and
   at least one processor-readable storage medium that stores at least one message oriented middleware server application executable by the at least one processor that causes the at least one processor to implement a message oriented middleware message provider that mediates messaging operations with a plurality of heterogeneous applications including a number of casino gaming applications, instances of the heterogeneous applications which execute on the plurality of networked processor-based client devices including the networked processor-based casino gaming devices.

2. The casino gaming environment integration gateway server computer of claim 1 wherein at least one of the networked processor-based casino gaming devices is a debit ticket kiosk system and at least one of the networked processor-based casino gaming devices is a centralized system for assigning unique identifiers used on debit tickets produced by the debit ticket kiosk system.

3. The casino gaming environment integration gateway server computer of claim 1 wherein the at least one message oriented middleware server application executable by the at least one processor causes the at least one processor to implement a local configuration cache service that manages configurations for at least some of the services provided by the message oriented middleware message provider.

4. The casino gaming environment integration gateway server computer of claim 1 wherein the at least one message oriented middleware server application executable by the at least one processor causes the at least one processor to provides a data transformation layer that provides data transformation services that automatically transforms data in messages and data processing services that automatically processes data in messages.

5. The casino gaming environment integration gateway server computer of claim 1 wherein the message oriented middleware message provider provides a point-to-point asynchronous messaging service in which a plurality of senders send messages to a queue and a plurality of receivers consume messages from the queue, and in which for any message in the queue only one of the receivers can consume the message.

6. The casino gaming environment integration gateway server computer of claim 5 wherein the senders and the receivers are changed dynamically during a runtime.

7. The casino gaming environment integration gateway server computer of claim 5 wherein the message oriented middleware message provider retains any messages in the queue even while there are no receivers.

8. The casino gaming environment integration gateway server computer of claim 5 wherein at least some of the messages in the queue are consumed in a different order than in which the messages are received in the queue.

9. The casino gaming environment integration gateway server computer of claim 1 wherein the message oriented middleware message provider provides a synchronous request-reply messaging service.

10. The casino gaming environment integration gateway server computer of claim 1 wherein the message oriented middleware message provider provides an asynchronous publish-subscribe messaging service wherein a number of publishers publish messages to a topic and a number of subscribers consume messages from the topic.

11. The casino gaming environment integration gateway server computer of claim 10 wherein a broker retains a number of messages for a subscriber that is inactive if the subscriber is indicated as being durable.

12. The casino gaming environment integration gateway server computer of claim 1 wherein the message oriented middleware message provider at least one of implements a centralized message server or distributes routing and delivery functions to at least some of the networked processor-based client devices.

13. The casino gaming environment integration gateway server computer of claim 1 wherein the message oriented middleware message provider retains the message until a receiving client retrieves the message allowing the networked processor-based client device that invoked the service to continue to process other data.

14. The casino gaming environment integration gateway server computer of claim 1 wherein the at least one message oriented middleware server application executable by the at least one processor causes the at least one processor to implement a communications services layer that provides communications services including at least an acknowledgement service.

15. The casino gaming environment integration gateway server computer of claim 1 the at least one message oriented middleware server application executable by the at least one processor causes the at least one processor to provide an administrative interface that allows load balancing of the services.

16. A method of operating a casino gaming environment integration gateway server computer to provide enterprise-wide services to a plurality of networked processor-based client devices including at least some networked processor-based casino gaming devices, the method comprising:
   providing a local configuration cache service that manages configurations for each of a number of services provided by a message oriented middleware message provider; and
   mediating messaging operations with a plurality of heterogeneous applications by the message oriented middleware message provider, the heterogeneous applications including a number of casino gaming applications, instances of the heterogeneous applications which execute on the plurality of networked processor-based client devices including the networked processor-based casino gaming devices.

17. The method of claim 16 wherein mediating messaging operations with a plurality of heterogeneous applications by a message oriented middleware message provider includes mediating messages between a debit ticket kiosk system and a centralized system for assigning unique identifiers.

18. The method of claim 16 wherein mediating messaging operations with a plurality of heterogeneous applications by the message oriented middleware message provider includes implementing a data transformation layer that provides data transformation services that automatically transforms data in messages and data processing services that automatically processes data in messages.

19. The method of claim 16 wherein mediating messaging operations with a plurality of heterogeneous applications by the message oriented middleware message provider includes providing a point-to-point asynchronous messaging service in which a plurality of senders send messages to a queue and a plurality of receivers consume messages from the queue, and in which for any message in the queue only one of the receivers can consume the message.

20. The method of claim 19 wherein mediating messaging operations with a plurality of heterogeneous applications by the message oriented middleware message provider further includes dynamically changing the senders and the receivers during a runtime.

21. The method of claim 19 wherein mediating messaging operations with a plurality of heterogeneous applications by the message oriented middleware message provider further includes retaining any messages in the queue even while there are no receivers.

22. The method of claim 19 wherein at least some of the messages in the queue are consumed in a different order than received.

23. The method of claim 16 wherein mediating messaging operations with a plurality of heterogeneous applications by the message oriented middleware message provider includes providing a synchronous request-reply messaging service.

24. The method of claim 16 wherein mediating messaging operations with a plurality of heterogeneous applications by the message oriented middleware message provider includes providing an asynchronous publish-subscribe messaging service wherein a number of publishers publish messages to a topic and a number of subscribers consume messages from the topic.

25. The method of claim 24 wherein mediating messaging operations with a plurality of heterogeneous applications by the message oriented middleware message provider further includes implementing a broker to retain a number of messages for a subscriber that is inactive if the subscriber is indicated as being durable.

26. The method of claim 16 wherein mediating messaging operations with a plurality of heterogeneous applications by the message oriented middleware message provider includes at least one of implementing a centralized message server or distributing routing and delivery functions to at least some of the networked processor-based client devices.

27. The method of claim 16 wherein mediating messaging operations with a plurality of heterogeneous applications by the message oriented middleware message provider further includes retaining the message until a receiving client retries the message allowing the networked processor-based client device that invoked the service to continue to process other data.

28. The method of claim 16 wherein mediating messaging operations with a plurality of heterogeneous applications by the message oriented middleware message provider further includes implementing a communications services layer that provides communications services including at least an acknowledgement service.

29. The method of claim 16, further comprising:
   providing an administrative interface that allows load balancing.

* * * * *